(12) United States Patent
McMullan et al.

(10) Patent No.: US 11,294,604 B1
(45) Date of Patent: Apr. 5, 2022

(54) SERVERLESS DISK DRIVES BASED ON CLOUD STORAGE

(71) Applicant: Qumulo, Inc., Seattle, WA (US)

(72) Inventors: Matthew Christopher McMullan, Bellevue, WA (US); Philip Ernst Taron, Tacoma, WA (US); Nicholas John Carter, Seattle, WA (US); Neal Thomas Fachan, Seattle, WA (US); Tyler Morrison Moody, Seattle, WA (US); Brian Matthew Richer, Seattle, WA (US); Matthew Thomas Roberts, Seattle, WA (US); Sudhesh Kumar Suresh, Redmond, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/508,869

(22) Filed: Oct. 22, 2021

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC ............ *G06F 3/067* (2013.01); *G06F 3/0604* (2013.01); *G06F 3/0655* (2013.01)

(58) Field of Classification Search
CPC ....... G06F 3/067; G06F 3/0604; G06F 3/0655
See application file for complete search history.

(56) References Cited

U.S. PATENT DOCUMENTS

| | | |
|---|---|---|
| 5,165,031 A | 11/1992 | Pruul et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp. 1-46.

(Continued)

*Primary Examiner* — Mark A Giardino, Jr.

(74) *Attorney, Agent, or Firm* — John W. Branch; Branch Partners PLLC

(57) ABSTRACT

Embodiments are directed to managing data in a file system that includes a plurality of storage nodes and a plurality of storage volumes such that each storage node may be a compute instance provided by a cloud computing environment (CCE) and each storage volume may be based on blobs provided by the CCE. Write requests that include write data may be provided. A lowest range of addresses in the storage volume may be determined for storing the write data. Buckets may be determined based on the range of addresses and the write data assigned to the buckets. If portions of the buckets remain unassigned, other data may be provided from a cache volume or the blobs. The write data and the other data may be written to the portion of the blobs.

28 Claims, 22 Drawing Sheets

(56) References Cited

U.S. PATENT DOCUMENTS

| | | |
|---|---|---|
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et |
| 7,330,948 B2 | 2/2008 | Deguchi et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,621,147 B1 | 4/2020 | Liang |
| 10,678,663 B1 | 6/2020 | Sharma et al. |
| 10,725,977 B1 | 7/2020 | Chmiel et al. |
| 10,860,546 B2 | 12/2020 | Ye et al. |
| 2001/0039622 A1 | 11/2001 | Hitz et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |

(56) References Cited

U.S. PATENT DOCUMENTS

| | | |
|---|---|---|
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Sarab |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker |
| 2015/0234879 A1 | 8/2015 | Baldwin et al. |
| 2015/0242263 A1 | 8/2015 | Klose |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1* | 10/2016 | Manville ............ G06F 16/1748 |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0288057 A1 | 10/2018 | Varadamma et al. |
| 2018/0314423 A1 | 11/2018 | Gong et al. |
| 2018/0365115 A1 | 12/2018 | Fang et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0286521 A1 | 9/2019 | Okpotse et al. |
| 2019/0286528 A1 | 9/2019 | Wu et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0142878 A1* | 5/2020 | Varadarajan ........ G06F 12/0246 |
| 2020/0174692 A1 | 6/2020 | Dave et al. |
| 2021/0042263 A1 | 2/2021 | Zdorov et al. |
| 2021/0042282 A1 | 2/2021 | Cseri et al. |
| 2021/0311841 A1 | 10/2021 | McNutt |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.

(56) References Cited

OTHER PUBLICATIONS

Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 28, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.

(56) References Cited

OTHER PUBLICATIONS

Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Examination Report for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970, Computer Usage Company, Newton Upper Falls, Massachusetts, pp. 422-426.
Office Communication for U.S. Appl. No. 16/262,756 dated Aug. 24, 2020, pp. 1-7.
Examination Report for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 15/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 15/152,277 dated Mar. 18, 2021, pp. 1-10.
Office Communication for U.S. Appl. No. 17/160,698 dated Mar. 18, 2021, pp. 1-11
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.

(56) References Cited

OTHER PUBLICATIONS

Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 17/190,653 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/190,653 dated Dec. 14, 2021, pp. 1-7.
Office Communication for U.S. Appl. No. 17/190,963 dated Dec. 21, 2021, pp. 1-12.

* cited by examiner

SERVERLESS DISK DRIVES BASED ON CLOUD STORAGE

TECHNICAL FIELD

The present invention relates generally to file systems, and more particularly, but not exclusively, to data storage for distributed file systems in cloud computing environments.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may include many storage volumes that may be subject to failure. In some cases, file systems may be hosted or implemented in cloud computing environments. Conventionally, distributed files system may include various built-in tools for managing various file system data, such as, backups, replication, data archiving, versioning, and so on. Also, in some cases, cloud computing environments may also provide some services directed to managing data stored in cloud deployments. However, some cloud computing environment storage services may operate differently than conventional or physical storage services used by some distributed file systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
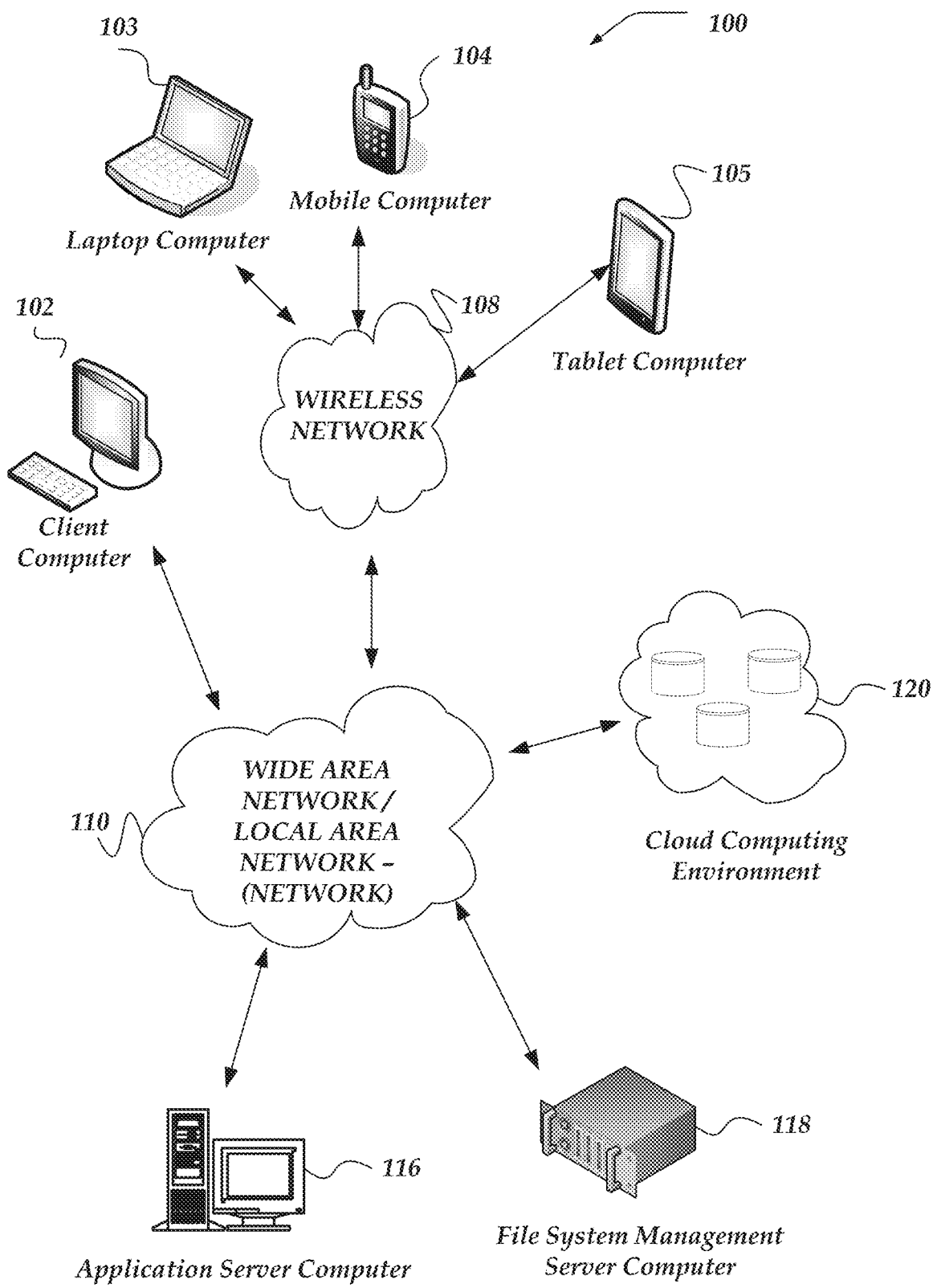
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as Rust, C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the terms "file path," "file system path," or "hierarchical file system path," and so on refer to file system information that corresponds to the logical or physical locations of file system objects within file systems. File system clients may employ file system paths to refer to specific file system objects within a file system. For example, file paths may include fields or values that correspond to the hierarchy of directories in the file system that correspond to the location of the file system object. In some cases, the name or label of the file may be considered to be a part path of the file system path. Also, often file system paths may be human readable.

As used herein the terms "block," or "file system object block" refer to the file system data objects that comprise a file system object. For example, small sized file system objects, such as directory objects or small files may comprise a single block. Whereas larger file system objects, such as large document files may comprise many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the terms "document object," or "document" refer to file system objects that may be considered a file. Accordingly, document objects may include one or more blocks that represent one combined file. The term document may be used to distinguish file system objects that are files from file system objects that may represent directories, folders, blocks, or the like. Documents have one or more content blocks that store the data comprising the document. Herein, documents may represent file that store any type of compressed or uncompressed data, such as, text, binary data, media (e.g., video files, music files, images, sound files, or the like), application documents (e.g., word processing files, databases, programs, libraries, or the like), structured documents, or the like. Herein documents may be considered to be stored in a file system rather than an object store. Documents may be considered to be associated file system paths or other file system meta-data that may be irrelevant or unavailable on object stores.

As used herein the term "storage volume" refers to virtualized data stores provided by cloud computing environments. Various attributes or features of storage volumes may vary depending on the cloud computing environment. However, in general, storage volumes may be considered to be logically similar to physical storage devices, such as, hard drives, solid state drives, network drives, or the like. Cloud computing environments provide APIs or other interfaces that enable programmatic provisioning of storage volumes. Also, among other things, cloud computing environments provide APIs or other interfaces that enable programmatic assignment/association of storage volumes with one or more virtualized network computers in the cloud computing environment.

As used herein the term "root volume" refers to a storage volume that includes files, programs, or the like, associated with administrative services of a storage node in a cloud computing environment. In some cases, root volumes may be storage volumes that store operating systems, kernel images, user access information, system libraries, log files, or the like, for a compute instance of a cloud computing environment. One of ordinary skill in the art may consider root volumes similar to Linux boot volumes/devices. Thus, storage nodes in cloud computing environments may be assumed to have one root volume.

As used herein the term "blob" refers to a storage volume that provides offset-based access to data storage over a network interface in a cloud computing environment (CCE). Such storage volumes include Azure Block Blobs, Azure Page Blobs, Amazon S3, and the like. Such blobs provide the ability to read them in whole or in part. Such blobs also include the ability to update or delete their content in whole or in part.

As used herein the term "configuration information" refers to information that may include rule-based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, the file system may include a plurality of storage nodes and a plurality of storage volumes such that each storage node may be a compute instance provided by a cloud computing environment (CCE) and each storage volume may be based on one or more block blobs provided by the CCE such that each block blob corresponds to a range of addresses in the storage volume.

In one or more of the various embodiments, one or more write requests that include write data may be provided from one or more clients of the file system.

In one or more of the various embodiments, a lowest range of addresses in the storage volume may be determined for storing the write data.

In one or more of the various embodiments, one or more buckets may be determined based on the range of addresses, such that the one or more buckets may correspond to a portion of the one or more block blobs that correspond to the lowest range of addresses, and such that the write data is assigned to the one or more buckets based on the lowest range of addresses.

In one or more of the various embodiments, in response to one or more portions of the one or more buckets remaining unassigned to the write data further actions may be performed, including: providing other data for the one or more unassigned portions of the bucket such that the other data may be provided from one or more of a cache volume or the one or more block blobs; writing the write data and the other data to the portion of the one or more block blobs; providing one or more responses to the one or more write requests to the one or more clients; or the like.

In one or more of the various embodiments, in response to a delete request being provided by the one or more clients further actions may be performed, including: updating a free list based on another range of addresses associated with the delete request such that the free list includes one or more addresses in the one or more storage volumes; determining one or more empty buckets based on the free list such that each location in each empty bucket corresponds to a portion of the one or more addresses; releasing the one or more empty block blobs to the CCE to reduce an amount of unused CCE storage space allocated to the file system; or the like.

In one or more of the various embodiments, one or more read requests may be provided from the one or more clients. In some embodiments, another range of addresses in the storage volume associated with the read request may be determined. In some embodiments, one or more read buckets may be determined based on the other range of addresses such that the one or more read buckets correspond to one or more other block blobs that correspond to the other range of addresses. And, in some embodiments, in response to the one or more read buckets being associated with a pending read job, read data for the one or more read requests may be determined at the completion of the read job. In some embodiments, in response to the one or more read buckets being unassociated with a pending read job further actions may be performed, including: generating a read job for the reading of the one or more read buckets from the one or more block blobs; adding the read job to a read queue that may be sorted based on the other range of addresses associated with the one or more read requests such that the read job may be positioned ahead of one or more other read jobs in the queue having a read address range that may be higher than the read job. executing the read job to provide the read data for the one or more read requests such that the read data is provided from the one or more other block blobs; or the like.

In one or more of the various embodiments, providing the one or more storage volumes, may include: providing an identifier of the file system and another identifier for each storage volume; determining a total address range for each storage volume based on a defined capacity of the storage volume; partitioning the total address range of each storage volume into one or more portions of the total address range such that each portion of the total address range corresponds to a same-sized portion of the capacity of each storage volume; provisioning the one or more block blobs from the CCE such that a capacity of each block blob may be equal to a portion of the total address range, and wherein a number of provisioned block blobs is less than a count of the one or more portions of the total address range; associating the one or more block blobs with the file system identifier and the storage volume identifier of its corresponding storage volume; or the like.

In one or more of the various embodiments, in response to the lowest range of addresses in the storage volume for storing the write data exceeding a maximum address that corresponds to a previously provisioned block blob further actions may be performed, including: provisioning one or more other block blobs with a same defined capacity from the CCE; associating the one or more other block blobs with another range of addresses that includes the lowest range of addresses determined for storing the write data; storing the write data in the one or more other block blobs; or the like.

In one or more of the various embodiments, in response to one or more compute instances for one or more storage nodes becoming unavailable further actions may be performed, including: employing the CCE to determine one or more unattached block blobs that may be associated with the one or more unavailable compute instances based on one or more identifiers associated with the file system and the one or more storage nodes; employing the CCE to associate the one or more unattached block blobs with one or more available storage nodes in the file system such that the one or more available storage nodes enable information previously stored on the one or more unattached block blobs to be available to the file system; or the like.

In one or more of the various embodiments, in response to an increased compute performance requirement for the file system further actions may be performed, including: employing the CCE to provision one or more additional compute instances; determining another portion of the one or more block blobs based on the increased performance requirements and the one or more additional compute instances; detaching the portion of the one or more block blobs from the plurality of storage nodes; attaching the other portion of the one or more block blobs to the additional computer instances; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, cloud computing environment 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, cloud computing environment 120, or other computers.

Client computers 102-105 may further be configured to include a client application that enables an end-user to log into an end-user account that may be managed by another computer, such as application server computer 116, file system management server computer 118, cloud computing environment 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, cloud computing environment 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, cloud computing environment 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

In some embodiments, cloud computing environment 120 may be one or more public or private cloud computing environments. In some embodiments, cloud computing environments may be provided by various vendors or developed internally or privately. Cloud computing environments typically provide virtualized network computers (e.g., compute instances), virtualized storage (e.g., storage volumes), virtualized network interfaces, or the like. Various cloud computing environments may be assumed to have one or more APIs or interfaces that enable users or services to provision resources, provision storage, configure networking, monitoring usage/status, or the like. One of ordinary skill in the art will be well acquainted with public or private cloud computing environments.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks, such as, cloud computing environment 120. Accordingly, these innovations and embodiments are not to be construed as being limited to a single environment, and other configurations, and other architectures are also envisaged.

Illustrative Client Computer

Figure 2:
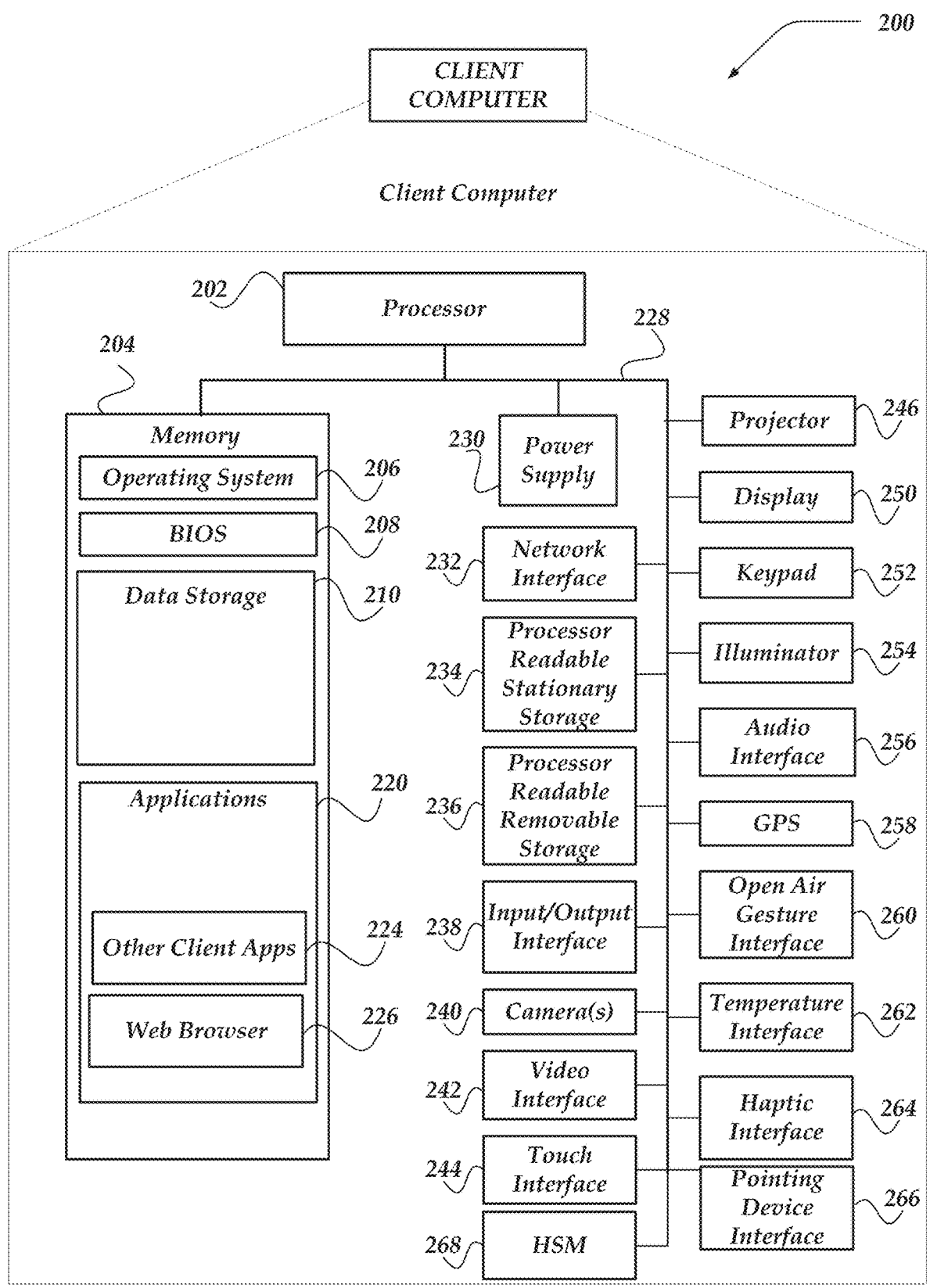
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include other client applications 224, web browser 226, or the like. Client computers may be arranged to exchange communications one or more servers or one or more other client computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
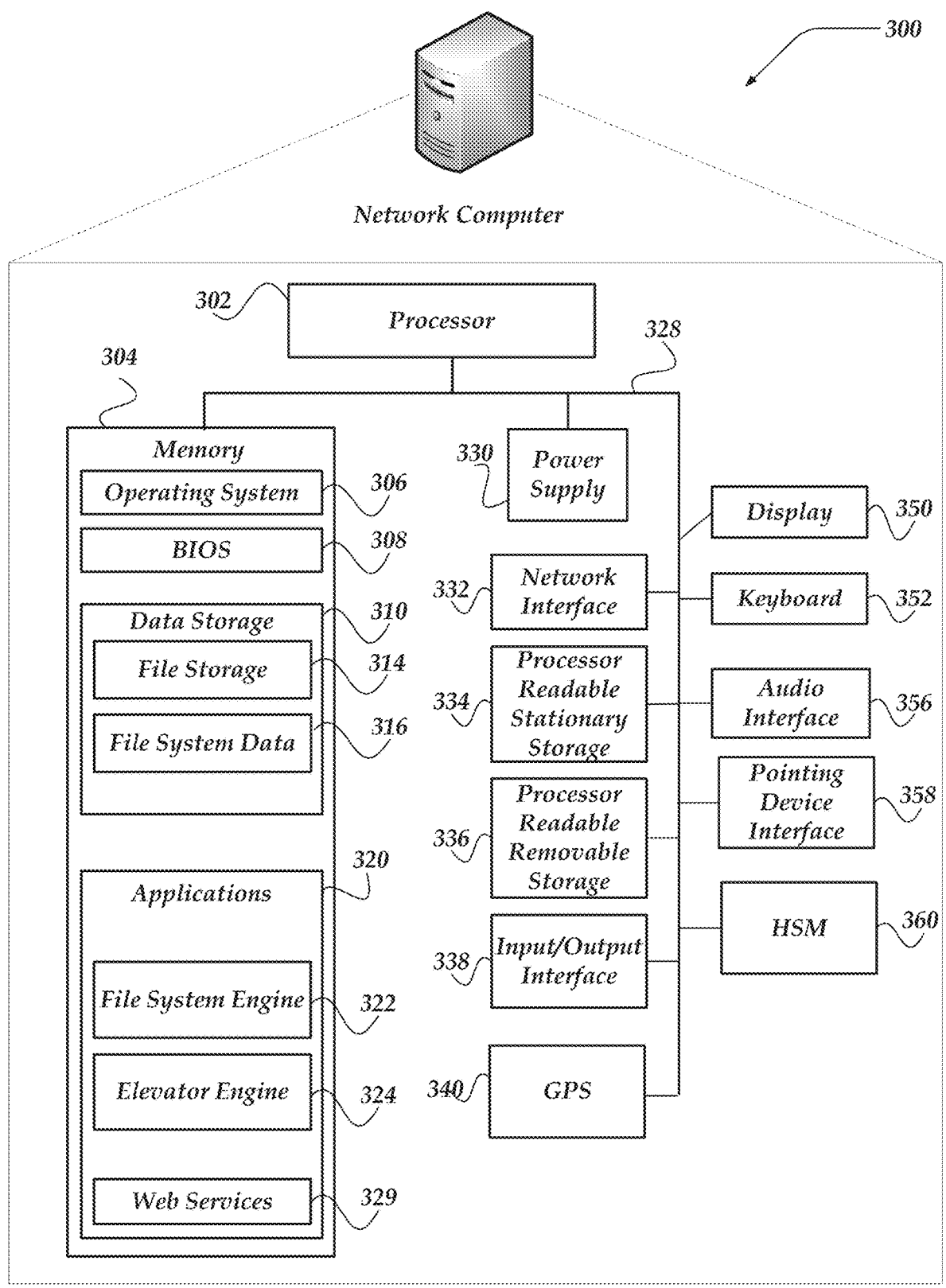
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1. Also, in some embodiments, network computer 300 may represent virtualized network computers in cloud computing environments, or the like.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, elevator engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, elevator engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, elevator engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, elevator engine 324, web services 329, or the like, may be provisioned and de-commissioned automatically.

Also, in one or more of the various embodiments, file system engine 322, elevator engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
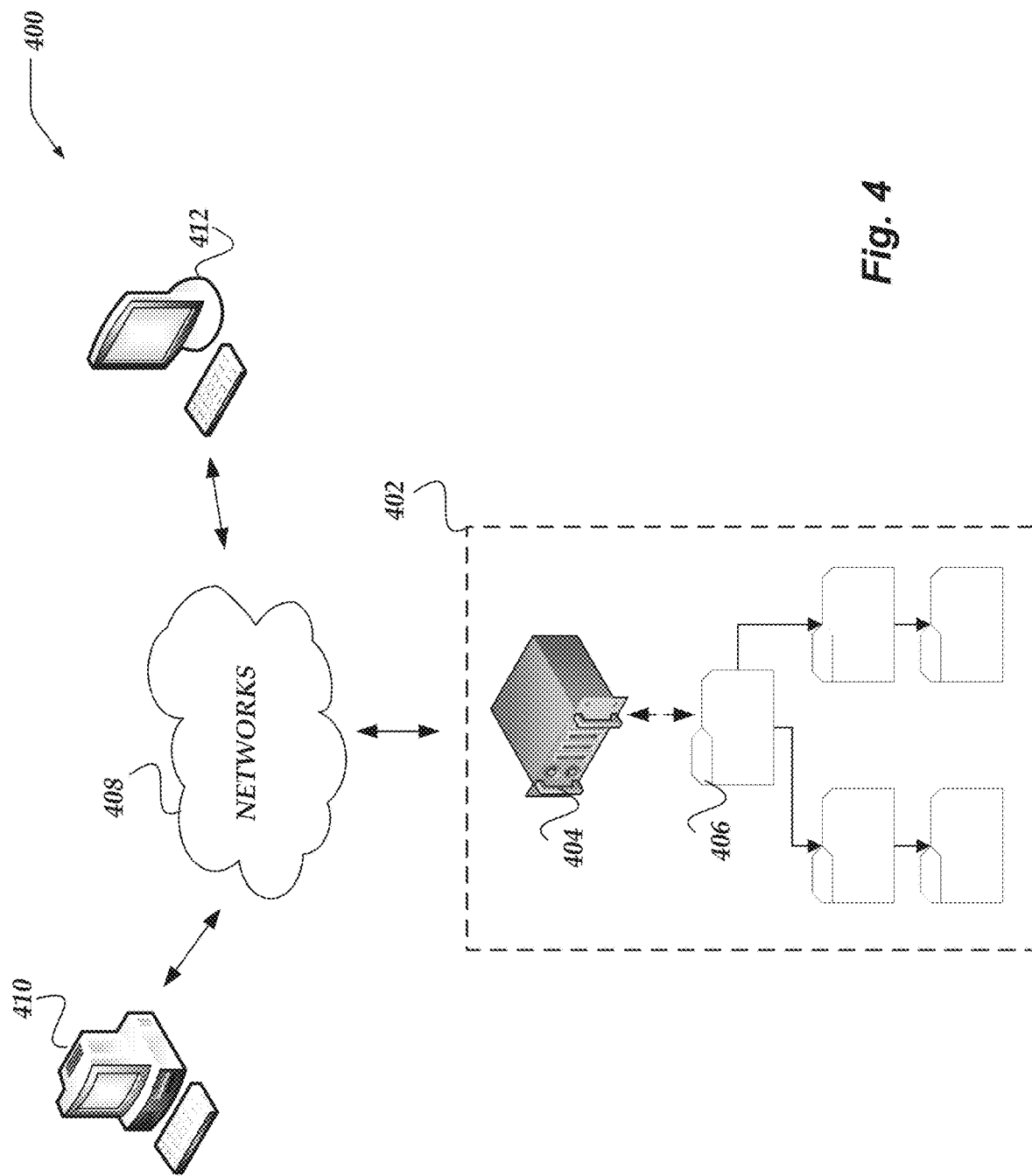
FIG. 4 illustrates a logical architecture of a system for serverless disk drives based on cloud storage in accordance with one or more of the various embodiments.

FIG. 4 illustrates a logical architecture of system 400 for serverless disk drives based on cloud storage in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include, files, documents, directories, folders, backups, snapshots, replication snapshots, replication information, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that may include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
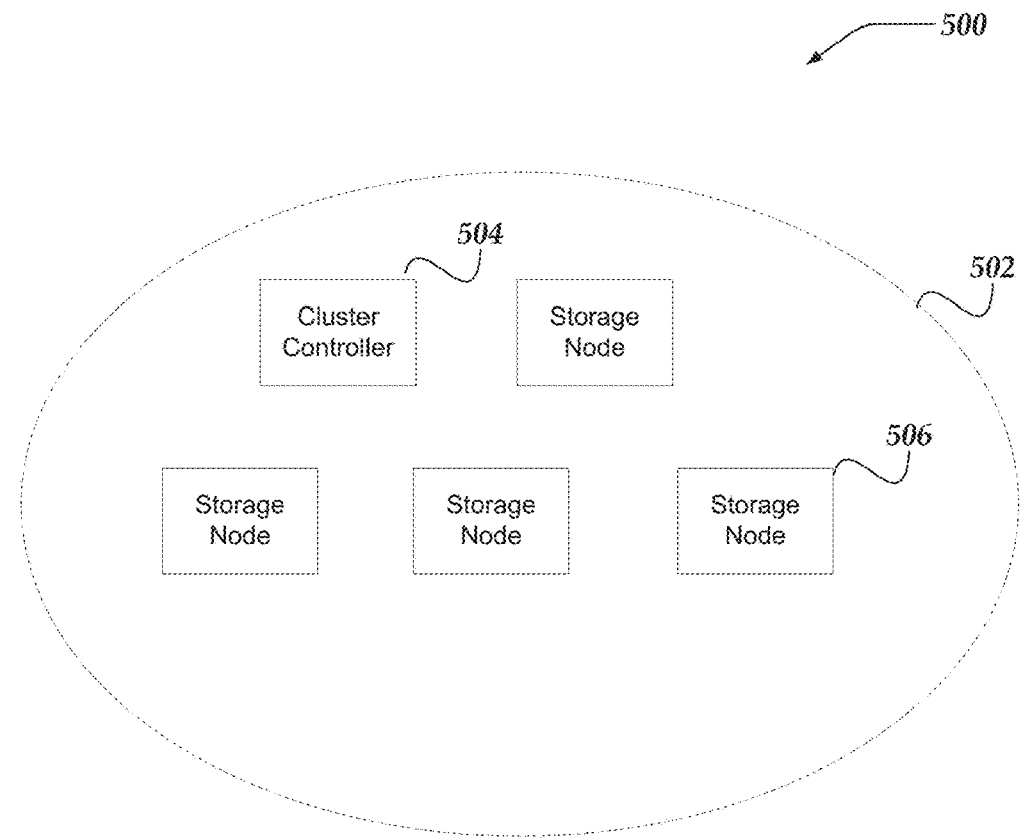
FIG. 5 illustrates a logical schematic of a cloud computing environment for serverless disk drives based on cloud storage in accordance with one or more of the various embodiments.

FIG. 5 illustrates a logical schematic of cloud computing environment 500 for serverless disk drives based on cloud storage in accordance with one or more of the various embodiments. As introduced above, file systems may be hosted or implemented in a cloud computing environment, such as, cloud computing environment 500.

In one or more of the various embodiments, cluster 502 may be a virtualized file system cluster hosted in cloud computing environment 500. In this example, the boundary of cluster 502 is illustrated using a dashed line to represent the dynamic or elastic nature of a cloud-hosted file system cluster. Accordingly, in some embodiments, the innovations disclosed herein anticipate various conventional cloud computing features, such as, programmatically/dynamically provisioning components, such as, compute instances, storage volumes, or the like. Also, in some embodiments, innovations may rely on other programmatic/dynamic features often provided by cloud computing environments, such as, network configuration, grouping or association of various cloud environment components with other components, component/object tagging systems, component/object labeling, or the like.

However, in some embodiments, for some cloud environments, one or more features may be missing or distinct/different from what may be conventionally expected from physical storage systems such as hard disks, solid state drives, or the like. Accordingly, in some embodiments, file system engines, or the like, may be arranged to include custom instructions or libraries, to provide one or more features that may be omitted from a given cloud computing environment. For example, in some embodiments, a cloud computing environment may omit a suitable tagging or labeling system. Thus, for this example, in some embodiments, file system engines may be arranged to provide or implement alternative systems such as a custom tagging system that associates key value pairs or other metadata with various components of the file system or cloud computing environment.

In one or more of the various embodiments, file systems hosted or implemented in cloud computing environments may be assumed to provide services similar as described above for FIG. 4. Thus, for brevity or clarity those descriptions are not repeated here.

In some embodiments, cluster 502 may include one or more cluster controllers, such as, cluster leader 504 and one or more storage nodes, such as, storage node 506, or the like. In one or more of the various embodiments, cluster leader 504 may be considered to the same or similar as file system management computer 404, or the like. Also, in some embodiments, cluster leader 504 may be considered to be a storage node that is designated (or elected) to provide some or all of the same services a file system management computer may provide.

In some embodiments, storage nodes, such as, storage node 506 may be considered to be cluster nodes that may be arranged to rely on or coordinate with cluster leaders, such as, cluster leader 504.

In one or more of the various embodiments, storage nodes may be associated with one or more storage volumes that may be based on data storage objects or storage services that may be provisioned from the cloud computing environment.

In this example, the storage volumes are not shown but they may be considered to be logically associated with the storage nodes.

Note, in some embodiments, cluster leaders may be storage nodes that have been selected (or elected) to provide controller services. Thus, in some embodiments, cluster leader nodes may be associated with one or more storage volumes similar as storage nodes.

Figure 6:
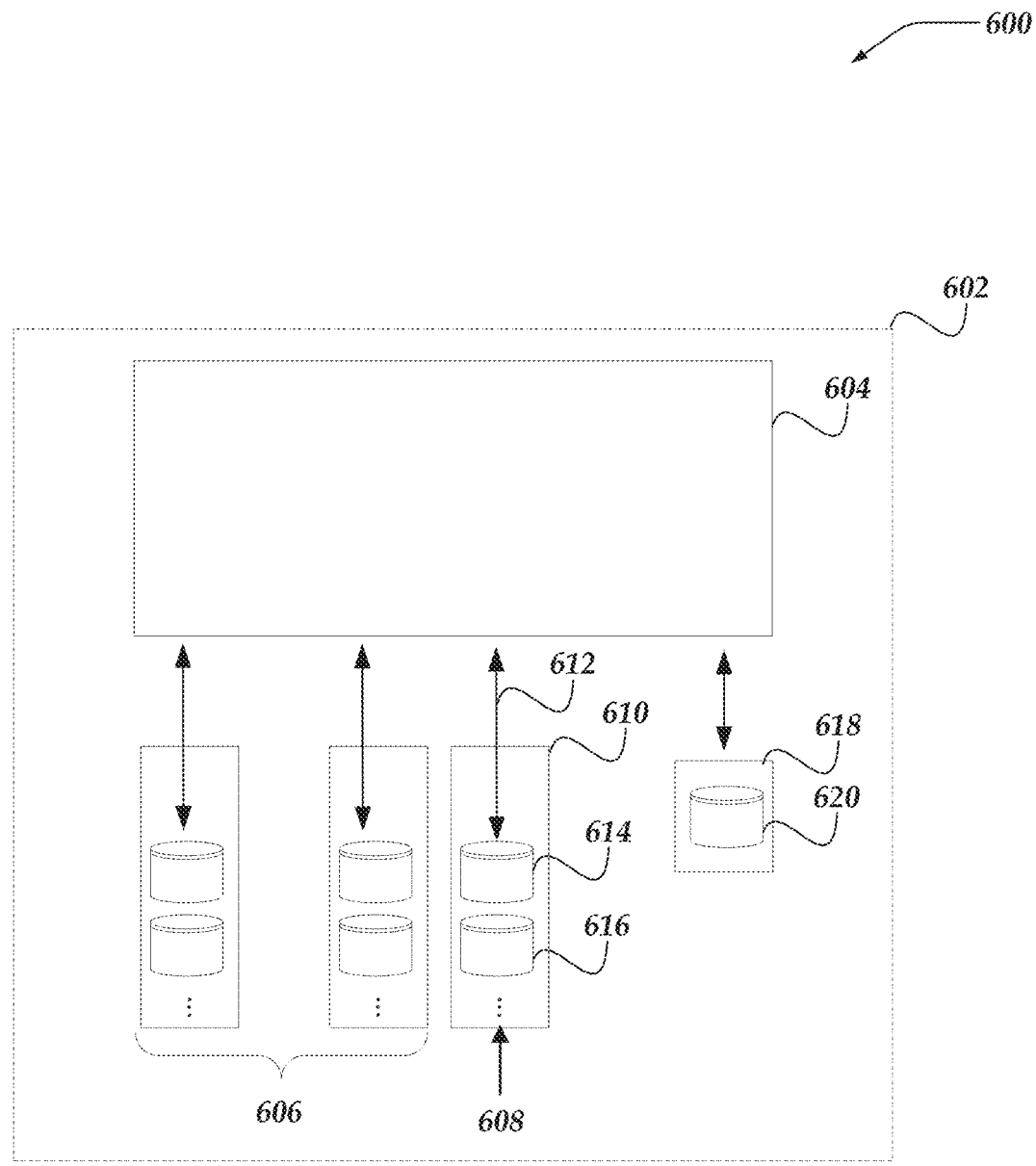
FIG. 6 illustrates a logical schematic of a cloud computing environment for serverless disk drives based on cloud storage in accordance with one or more of the various embodiments.

FIG. 6 illustrates a logical schematic of cloud computing environment 600 for serverless disk drives based on cloud storage in accordance with one or more of the various embodiments.

In one or more of the various embodiments, as described above, cloud computing environments may enable one or more compute instances that may be employed as storage nodes of a distributed file system.

In one or more of the various embodiments, nodes in cloud computing environments may be associated with one or more storage volumes similar or analogous to how storage volume devices may be physically coupled with physical storage nodes. However, rather than being physical storage devices (hard drives, solid state drives, or the like), storage volumes for cloud storage nodes may be virtualized storage volumes that may be communicatively coupled to compute instances in the cloud computing environment.

In one or more of the various embodiments, cloud computing environments may provide configuration tools, APIs, user interfaces, or the like, that enable users to configure or select storage volumes that may have different attributes (e.g., capacity, response time, I/O performance, encryption, or the like) based on the needs of an application of user. Accordingly, storage volumes may be logically associated with compute instances in cloud computing environment to provide private or logically local storage. Thus, in some embodiments, storage volumes that are associated with a compute instance may be considered virtual storage devices.

In one or more of the various embodiments, storage nodes, such as, storage nodes 602 may be comprised compute instance 604 and one or more storage slots, such as, storage slots 606 and storage slot 608. In some embodiments, each storage slot may represent a specified amount of data storage capabilities that correspond to the storage capacity a storage node may contribute to the file system.

In one or more of the various embodiments, storage nodes may be configured to have one or more storage slots each with known attributes. In some embodiments, storage slots may be considered analogous to physical storage device slots of a physical server. For example, a physical storage node may include one or more physical hard drives that each may be installed in a physical slot of the physical storage node. However, in some embodiments, storage slots in storage nodes such as storage node 602 may be added or removed from storage nodes without physical limitations. Though, in some cases, cloud computing environments may impose restrictions related to costs, network bandwidth, capacity limitations, or the like. In cloud computing environments, in some embodiments, virtualized compute instances may be configured to have one or more storage slots that each represent or include an allocation of storage capacity in the cloud computing environment.

In one or more of the various embodiments, virtualized storage slots, such as storage slots 606 and storage slot 608 may be associated with storage volumes, such as storage volume 610. In some embodiments, storage volumes may be data structures that file system engines employ to represent or manage data storage objects provided in cloud computing environments. In some embodiments, file system engines may be arranged to employ elevator engines, or the like, manage storage volumes. In some embodiments, storage volumes in cloud computing environments may be considered abstractions that enable file system engines to rely on the same or similar actions/operations as they employ for physical storage volumes.

In one or more of the various embodiments, storage volumes, such as, storage volumes 606 or storage volume 608 may employ storage objects or storage services provided by the cloud computing environment to provide storage capacity for the virtualized storage volumes. In one or more of the various embodiments, storage objects may be interacted with via APIs or interfaces provided by the cloud computing environment.

In one or more of the various embodiments, cloud computing environments may provide a variety of different types or classes or storage objects. Including one or more storage objects that closely emulate hard disk drives. In most cases, cloud computing environment offer may provide different features or characteristics depending on the type or class of storage object, such as, interaction restrictions, performance guarantees, varied APIs, varied pricing, or the like. Thus, in some embodiments, one or more storage object types may be more or less advantageous than another depending on the local circumstances or local requirements.

Accordingly, in some embodiments, file system engines may be arranged to employ different types of storage objects depending on the circumstance. For example, performant high cost storage objects may be employed to provide data storage for cache tiers while less performant lower cost storage objects may be employed for storage tiers. In some cases, this may be analogous to using physical SSDs for a cache tier and physical HDDs for a persistent storage layer.

In some cases, cloud computing environments may provide storage objects that may be considered bulk storage objects that may be optimized (by pricing or features) for large read or writes. While different cloud computing environments may provide bulk storage objects that may have some different features, APIs, capacity limits, or the like, herein bulk storage objects may be referred to as block blobs.

Likewise, in some cases, cloud computing environments may provide storage objects that may be optimized (by pricing or features) for smaller sized read or writes. Further, some cloud computing environments may provide storage objects that may be resized after they have been instantiated. While different cloud computing environments may provide storage objects that may have some different features, APIs, capacity limits, or the like, herein storage objects associated with smaller-sized/faster reads, smaller-sized/faster writes, dynamic sizing, or the like, or may be referred to as page blobs.

Further, in some embodiments, cloud computing environments may provide one or more storage object types that can be used as either page blobs or block blobs. Accordingly, in some embodiments, file system engines may be arranged to distinguish page blobs and block blobs based on how file system engines may be configured to interact with a given storage object rather than explicitly instantiating different types of storage objects in the cloud computing environment. For example, if a cloud computing environment provides one type of storage object that can act as a page blob or a block blob, file system engines may designate page blobs or block blobs based on their role in the file system.

As mentioned above, for brevity and clarity, page blobs may be considered storage objects that may be intended to be accessed often with varying sized reads or writes. Further, herein page blobs may be considered to support being resized after they have been instantiated. Thus, for example, if the cloud computing environment prices the page blob based on its allocated/provisioned storage capacity, file system engines may be arranged to reduce the size of page blobs to reduce costs if appropriate.

Also, for brevity and clarity, block blobs may be considered storage objects that may be optimized for larger bulk reads or writes. Also, in some cases, cloud computing environments may enable block blobs to be instantiated with requested fixed size that may not be resized.

Note, in some cases, cloud computing environments may enable different features, such as, enabling bulk storage objects to be resized. However, in some cases, it may remain optimal in terms of price or performance to treat them as having a fixed size. But, herein, block blobs may be considered to be treated as if they are fixed size even if the underlying bulk storage objects provided by the cloud computing environment enable resizing. Accordingly, in some embodiments, file system engines or elevator engines may be arranged to enforce page blob or block blob behavior on storage objects provided by cloud computing environments.

In one or more of the various embodiments, storage volumes may be comprised of one or more block blobs, such as, block blob 614, block blob 616, and so on. In some embodiments, block blobs may be mass storage objects provided by the cloud computing environment. In some embodiments, cloud computing environments often provide block blobs as first-class objects that may be instantiated, accessed, released, or the like, via one or more published APIs. Accordingly, in some embodiments, file system engines may be arranged to interact with block blobs via the APIs provided by cloud computing environments. In some embodiments, the particular APIs for interacting with block blobs or other cloud computing environment objects (e.g., compute instances, tagging systems, object querying, or the like) may be considered well known to one of ordinary skill in the art. Accordingly, in some embodiments, file system engines may be arranged to employ libraries, instructions, rules, or the like, provided via configuration information to map file system operations/actions to one or more APIs provided by cloud computing environments.

In one or more of the various embodiments, file system engines may be arranged to provide cache volumes that provide storage for cache tiers. Accordingly, in some embodiments, storage nodes may be arranged to include cache volumes, such as, cache volume 618. Similar to how storage volumes may be data structures file system engines employ to manage block blobs, cache volumes may be data structures employed for managing page blobs that provide the storage capacity for the cache volume. For example, in analogous physical systems, SSDs may be employed as cache volumes. However, cloud-based storage nodes, such as, storage node 602 may employ cache volumes based on page blobs.

In one or more of the various embodiments, compute instances associated with block blobs or page blobs may be arranged to exchange messages or data using one or more data paths provided by cloud computing environments. The particular underlying implementation of data paths may vary depending on the cloud provider; however they may be generally considered logical data busses that enable compute instances to interact with storage volumes similar to interactions with physical storage devices. In this example, data path 612 represents the one or more cloud computing environment features (e.g., APIs) that enable processes hosted on compute instances to interact with block blobs or page blobs in cloud computing environments.

In one or more of the various embodiments, cloud computing environments may enable the allocation or instantiation of block blobs or page blobs that may be unassociated with a particular compute instance. In some embodiments, this feature may enable block blobs or page blobs to be created in advance or otherwise reserved. Likewise, in some embodiments, cloud computing environments may enable block blobs or page blobs to be decoupled or disassociated from compute instances. In some cases, this may include releasing/discarding/reallocating unused block blobs. Likewise, in some cases, this may include resizing page blobs.

Also, in some embodiments, a common feature of cloud computing environments is that compute instances may be rapidly instantiated or discarded to enable a cloud-based compute clusters to scale up or down depending on current performance requirements or other considerations, such as, cost. In other words, compute instances in cloud computing environment may often be ephemeral as compared to physical computers. Further, in some embodiments, for various reasons, virtual compute instances may be less stable or reliable than physical computers. Accordingly, one of ordinary skill in the art may expect that virtual computer instances may crash, disappear, or otherwise become inaccessible more often than physical computers. However, unlike physical computers, if virtual computer instances drop out of a cluster, the storage objects associated with the computer instance may remain visible via one or more cloud computing environment APIs even though the compute instance they were associated with has crashed or otherwise become unavailable. For example, if compute instance 604 crashes, block blob 614, or the like, and page blob 620 may remain viable/intact except for the fact that they would no longer be associated with a running compute instance.

Figure 7:
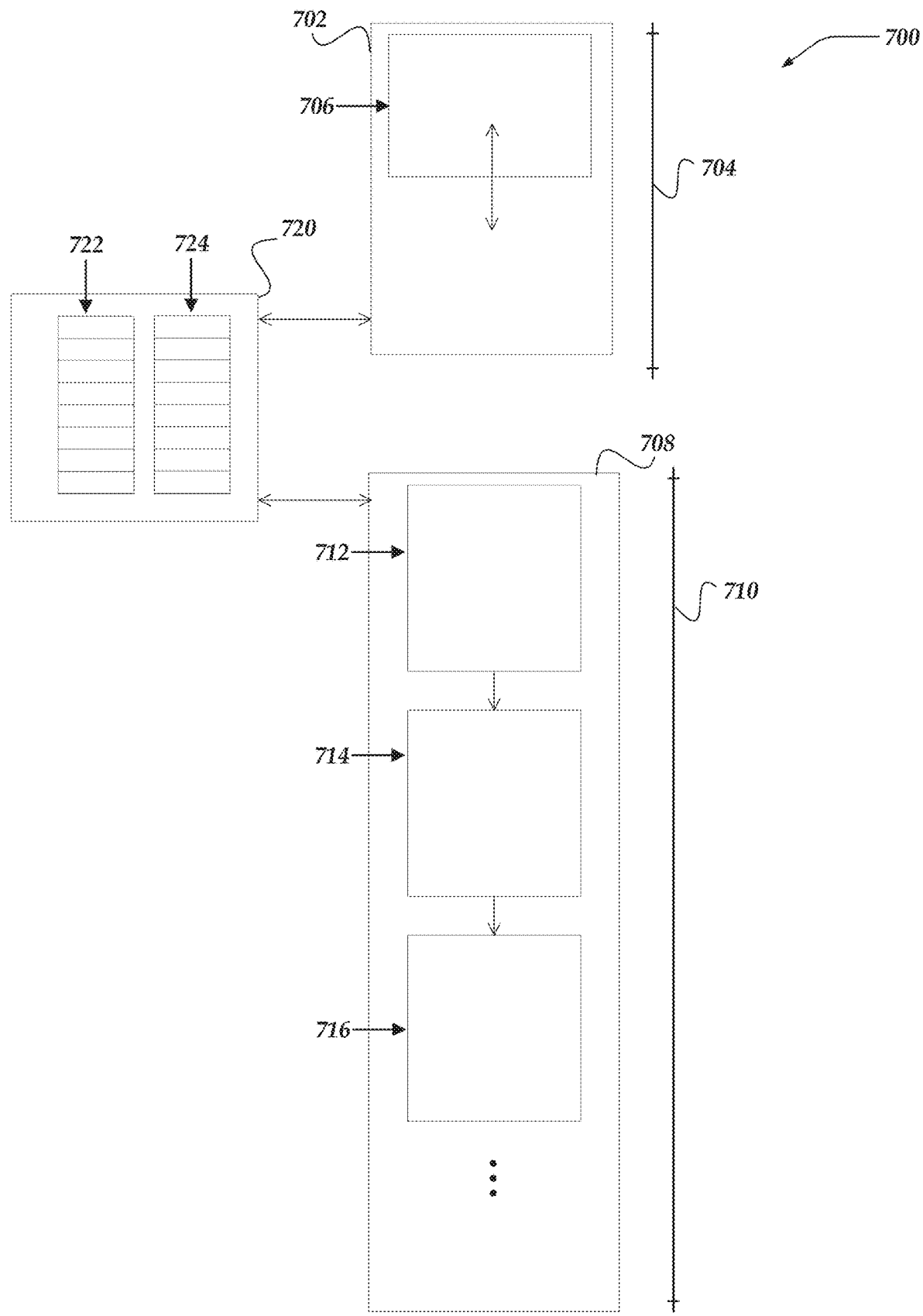
FIG. 7 illustrates a logical schematic of a system for serverless disk drives based on cloud storage in accordance with one or more of the various embodiments.

FIG. 7 illustrates a logical schematic of system 700 for serverless disk drives based on cloud storage in accordance with one or more of the various embodiments. As described above, storage nodes may be associated with one or more cache volumes and one or more storage volumes. In this example, cache volume 702 represents a cache volume associated with a storage node (not shown). Also, in this example, storage volume 708 represents a storage volume associated with the storage node.

In one or more of the various embodiments, cache volumes may be configured to represent an address range of storage locations. In some embodiments, the logical address range or capacity supported by a cache volume may be represented by address range 704. For example, if cache value 702 is configured to have a capacity of 1 TB, address range 704 represents a range of storage locations in the cache from 0 to 1 TB. In some embodiments, file system engines may be arranged to access data in chunk sizes of 4 KB, 1 MB, or the like, thus each location represented by address range 704 may reference a chunk of storage capacity.

In one or more of the various embodiments, cache volumes may include a page blob, such as, page blob 706. As described above, page blobs may be considered cloud computing environment storage objects that provide the storage capacity for cache volumes. In this example, page blob 706 is shown (not to scale) to have a storage capacity that may be less than address range 704. However, as described above, page blobs may be dynamically resized to scale up down depending on the amount of data stored in the cache volume. In some embodiments, additional page blobs may be allocated to provide storage for more of the address range Accordingly, in this example, as cache volume 702 is filled, page blob 706 may be resized or another page blob added to accommodate the additional data.

In one or more of the various embodiments, one or more storage volumes, such as, storage volume 708 may be associated with a storage node. In some embodiments, similar to cache volume 702, storage volume 708 may be configured to support an address range represented by address range 710. In some embodiments, address range 710 may be considered similar to address range 704 except that it represents the storage capacity of storage volume 708 which may be much larger than the capacity of cache volume 702.

As described above, in some embodiments, storage volumes may include one or more block blobs that provide storage capacity for file system data that may be stored in storage volumes. In this example, storage volume 708 includes block blob 712, block blob 714, and block blob 716.

Further, in some embodiments, page blobs may be employed rather than being limited to block blobs.

In one or more of the various embodiments, block blobs in storage volumes may be considered to align with storage volume sectors where each storage volume sector corresponds to a range of locations/addresses in the storage volume. For example, block blob 712 may be considered to correspond to the first storage volume sector, block blob 714 may be considered to correspond to the second storage volume sector, and so on.

In one or more of the various embodiments, the size of the block blobs may be determined based on the file system configuration subject to limitations/optimizations of the cloud computing environment. Thus, in this example, more than one block blob may be required to provide a capacity that matches address range 710. For example, if overall capacity of storage volume is configured to 100 TB and the cloud computing environment restricts block blobs to have a maximum capacity of 2 TB, it would take at least 50 block blobs to match the configured capacity for storage volume 708. However, in one or more of the various embodiments, block blobs may be added to a storage volume as they may be needed, with each block blob mapping to a portion of the storage volume's address range. Likewise, if the file system is not using one or more block blobs to store file system data, file system engines may discard/release the empty unused block blobs.

In one or more of the various embodiments, file system engines may employ elevator engines, such as, elevator engine 720, to support file system operations by providing an interface between storage volumes, cache volumes, page blobs, and storage nodes. In one or more of the various embodiments, elevator engines may be arranged to manage read or writing from storage volumes, block blobs, cache volumes, page blobs, or the like. Also, in some embodiments, elevator engines may be arranged to include one or more job queues, such as, write queue 722 or read queue 724. In some embodiments, job queues may be arranged to manage the execution of read requests or write requests.

In one or more of the various embodiments, elevator engines may be arranged to read or write to block blobs using chunks of data that may be larger than the file system chunks supported/preferred by the cache volume. For example, a file system may be arranged to use 4 KB file system chunks while storage volumes may be configured to use 4 MB chunks. Thus, the file system engine may interact with file system objects (e.g., files) in terms of file system chunks (e.g., 4 KB chunks) while the elevator engine interacts with storage volumes or block blobs using block storage chunks (e.g., 4 MB chunks) that may be much larger than the file system chunks.

In some embodiments, different file systems may be enabled to configure the size of file system chunks or the size of block chunks differently to support various local circumstances or local requirements. For example, for some cloud computing environments accessing block blobs using block chunks that are the same size as the file system chunk may be prohibitively expensive in terms of price or performance. Accordingly, in one or more of the various embodiments, in some cases, job queues in elevator engines may be employed to batch requests into buckets that match the capacity of block chunk size. Thus, if the block chunk size is 4 MB, elevator engines may be configured to employ 4 MB buckets.

Note, for brevity and clarity, herein file system chunk size may be assumed to be 4 KB and block chunk size may be assumed to be 4 MB. But one of ordinary skill in the art will appreciate that file system chunk size or block chunk size may be configured to have different/other capacities depending on local circumstances or local requirements, including the price/performance characteristics of storage objects/services provided by cloud computing environments.

Accordingly, in some embodiments, as read or write requests are provided to a storage node, the elevator engine may attempt to batch reads or writes into jobs that may correspond to a bucket. For example, if a client sends four separate requests to read 1 MB that happen to be contiguous and aligned with a block chunk boundary, the elevator engine may attempt to batch the four requests into a single read from a block blob of a storage volume.

In one or more of the various embodiments, read requests may include at least an identifier with a contiguous range of addresses, either a start and length, or a start location and an end location. Further read requests may include additional file system information/attributes such as permissions, access dates, other metadata that may be of concern to the file system engine rather than the elevator engine.

Accordingly, in one or more of the various embodiments, if a read request may be provided to an elevator engine, the elevator engine may determine which bucket the request should be associated with based on the address range associated with the read request. For example, if a request to read 16 KB of data starting at address 1000 is received, that request may be associated with the first bucket. (Assuming that 0 is the address of the first location in the block storage volume and each bucket size is greater than 17 KB.)

In one or more of the various embodiments, elevator engines may be arranged to initiate read jobs that execute one or more actions to retrieve the requested data from the storage volume or block blobs. Accordingly, in some embodiments, if the bucket for a read may be determined, the elevator engines may initiate a read job to perform the actions that may be required to obtain the data that corresponds to the request. In some embodiments, read jobs may be arranged to read at least one bucket-sized chunk from block blobs. Thus, in some cases, the elevator engine may read back more data than requested. For example, if the request is to read 32 KB and the bucket size is 4 MB, 4 MB will be read from a block blob to service the request.

In some embodiments, jobs for requests may be ordered based on the order they are provided to the elevator engine. However, in some embodiments, elevator engines may be arranged to consider various factors that may be used to prioritize or otherwise sort requests/jobs, including address range.

As described above, jobs may be associated with at least one bucket, accordingly, if the bucket for read request may already be in the read queue, the read request may be associated with that bucket and job that is already queued. Thus, in this circumstance, for some embodiments, later provided read requests may jump ahead of other read requests that were previously provided to the elevator engine depending on where the job associated with their bucket is in the queue. Similarly, in some embodiments, if read job for a bucket is in process such that it is being executed rather than waiting in the read queue, elevator engines may be arranged to hold read requests that may be requesting data from the same bucket that is in the process of being retrieved rather than creating another read job.

In one or more of the various embodiments, if a bucket may be retrieved from a block blob, the elevator engine may be arranged to distribute the bucket data to the appropriate read requests and enable the file system engines to provide the requested data to the clients that made the read requests. In some embodiments, extra data read from the block may be made accessible in a cache volume or system memory in anticipation of potential future requests for that data.

Further, in some embodiments, elevator engines may be arranged to prioritize read requests based on the address ranges associated with the request. Accordingly, in some embodiments, read requests associated with locations having lower addresses may be prioritized over read requests associated with higher addresses. For example, if the next job in the read queue is for a bucket at location C, a later received read request associated with bucket A is provided, the elevator engine may be arranged to initiate job to retrieve bucket at location A and add it to the job queue ahead of (in front of) the job for the bucket that corresponds to location C. (Assuming A represents a location in the block storage volume that comes before location C in the same storage volume.)

In some embodiments, elevator engines may be arranged to process write requests similarly but with some differences. In some embodiments, elevator engines may prioritize write requests based on the time received and the address of destination location of the data being written. Thus, in some embodiments, write requests may be associated with a bucket and a write job to write the bucket to the storage volume. However, in some embodiments, if the write job is being executed for write requests that are smaller than the bucket size, elevator engines may execute a read from the block blob, to get the current data for the remainder of the block. For example, if a block blob bucket size is 4 MB and a write request associated with the block is less than the entire 4 MB, the elevator engine may read the 4 MB bucket from the block before executing the write. Thus, in some embodiments, the 4 MB read from the block blob may be updated with the incoming data corresponding to the write request, before the entire 4 MB bucket is written back to the relevant block blob.

However, in some embodiments, to reduce the need for read-before-write actions, elevator engines may be arranged to check the cache tier to determine if the missing information may be available in the cache tier. Thus, in some embodiments, if write buckets may be filled from write request data and data in local cache tiers, the number read-before-write actions may be reduced. Also, if write buckets may be filled from request data and data from a cache volume, the read-before-write operation may be executed more quickly or with potentially more desirable transaction costs.

In one or more of the various embodiments, elevator engines or file system engines may be arranged to prioritize storing data in locations with lower addresses.

Accordingly, in some embodiments, storing data in the cache tier at lower addresses (when available) increases the likelihood that the locations associated with higher addresses of the page blob may be empty. Thus, in some embodiments, the likelihood that page blobs may be trimmed to reduce their size is increased. The likelihood of having to allocate additional blobs to store the data in a new address range is also similarly decreased.

Similarly, in some embodiments, biasing block storage volumes to prefer locations with lower address over locations with higher addresses may increase the likelihood that an entire block blob (e.g., block blobs nearer the end of the storage volume address space) may become empty enabling empty block blobs to be released back to the cloud computing environment. However, in some embodiments, file system engines may still present a capacity that may be larger than the amount of block blob storage that has been provisioned from the cloud computing environment. Accordingly, in some embodiments, if a cloud computing environment sets the cost of data storage based on the number of allocated/provisioned block blobs, releasing unused block blobs may reduce the price of the storage while not reducing the apparent capacity of the storage volumes.

In contrast, for example, if data may be stored in storage volumes at locations that may be evenly distributed, it is more likely that data may be stored in more block blobs preventing them from being released to the cloud computing environment. Likewise, for page blobs, if the locations of data stored in the cache tier is evenly distributed across the address range of the cache tier, it may be difficult for elevator engines or file system engines to trim the page blobs to reduce the size of the page blob providing the underlying storage for the cache tier.

Further, in some embodiments, biasing storage locations in storage volumes to locations with lower addresses may increase the likelihood that block blob buckets may be full/fully-subscribed before read jobs or write jobs may be executed. For example, if most data in a storage volume is stored at the addresses, then most requests may reference data from lower addresses. Accordingly, in some embodiments, there may be an increased likelihood that read or write buckets may be completely filled before their jobs are executed.

Generalized Operations

FIGS. 8-22 represent generalized operations for serverless disk drives based on cloud storage in accordance with one or more of the various embodiments. In one or more of the various embodiments, processes 800, 900, 1000, 1100, 1200, 1300, 1400, 1500, 1600, 1700, 1800, 1900, 2000, 2100, and 2200 described in conjunction with FIGS. 8-22 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-22 may perform actions for backup services for distributed file systems in cloud computing environments in accordance with at least one of the various embodiments or architectures such as those described in conjunction with FIGS. 4-7. Further, in one or more of the various embodiments, some or all of the actions performed by processes 800, 900, 1000, 1100, 1200, 1300, 1400, 1500, 1600, 1700, 1800, 1900, 2000, 2100, and 2200 may be executed in part by file system engine 322, or elevator engine 324.

Figure 8:
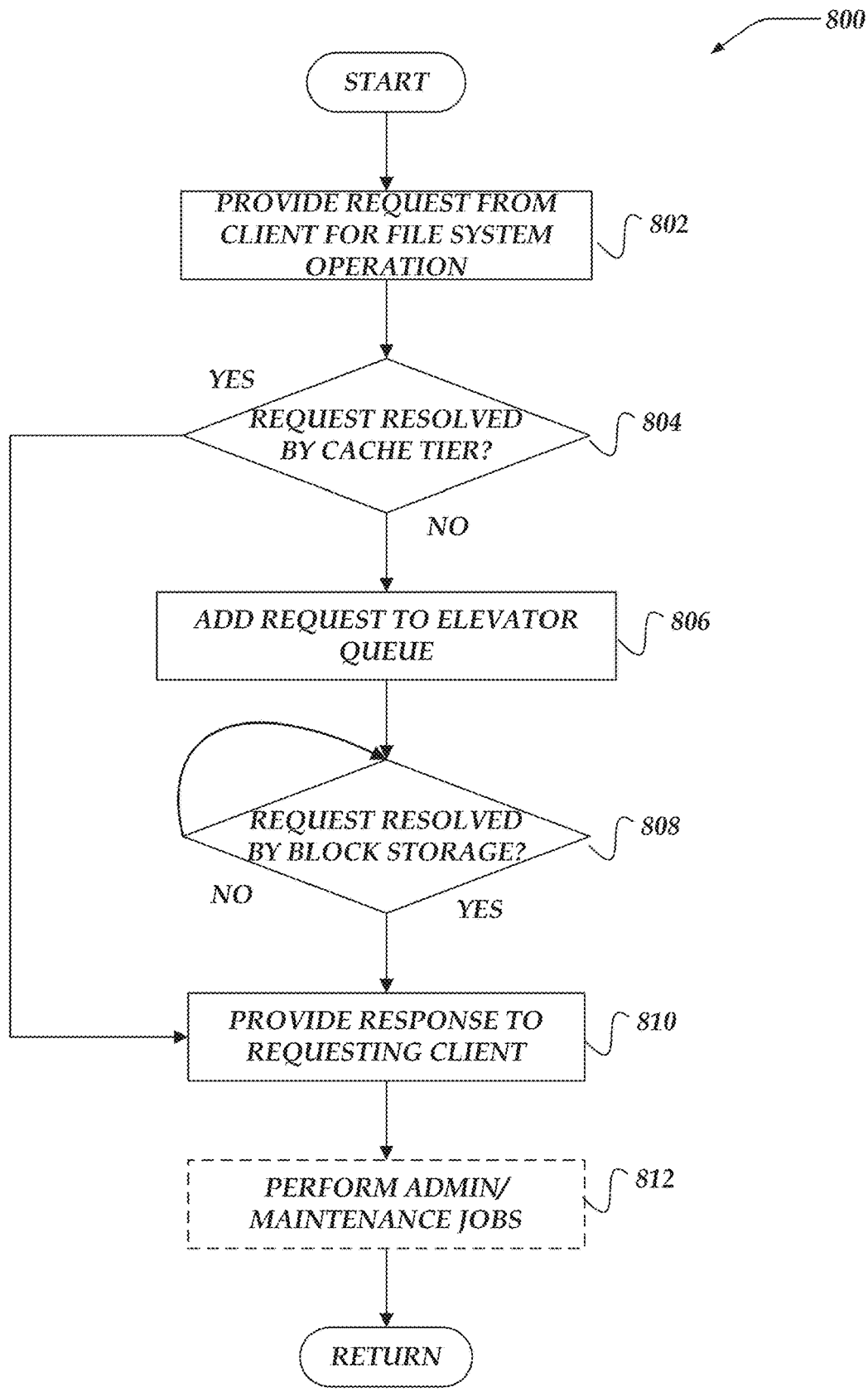
FIG. 8 illustrates an overview flowchart for a process for serverless disk drives based on cloud storage in accordance with one or more of the various embodiments

FIG. 8 illustrates an overview flowchart for process 900 for serverless disk drives based on cloud storage in accordance with one or more of the various embodiments. After a start flowchart block, at flowchart block 802, in one or more of the various embodiments, one or more requests may be provided by one or more clients. In one or more of the various embodiments, requests may include one or more requests to read data from a file system or one or more requests to write data to the file system. At decision flowchart block 804, in one or more of the various embodiments, if the one or more provided requests may be resolved by the cache tier, control may flow to flowchart block 810; otherwise, control may flow to flowchart block 806. At flowchart block 806, in one or more of the various embodiments, file system engines may be arranged to add the one or more requests to an elevator queue. At decision flowchart block 808, in one or more of the various embodiments, if the one or more requests may be resolved by one or more flowchart block storage volumes, control may flow to flowchart block 810; otherwise elevator engines may be arranged to process other requests in the queues until the provided one or more request may be resolved. In some embodiments, if an error condition or timeout occurs, the one or more provided requests may be abandoned, and control may flow to flowchart block 810. At flowchart block 810, in one or more of the various embodiments, file system engines may be arranged to provide the one or more responses to the one or more provided requests based on the information or data provided from the block storage volumes. In some embodiments, in some cases, if an error condition or timeout occurred, the response may include an error code, notification, acknowledgment, or the like, the clients that provided the requests. At flowchart block 812, in one or more of the various embodiments, optionally, file system engines or elevator engines may be arranged to perform one or more maintenance or administrative jobs. In some embodiments, maintenance or administrative jobs may include trimming/expanding page blobs, provisioning or releasing block blobs, data recovery, or the like. Note, this flowchart block is indicated as being optional because maintenance or administrative jobs may be performed if one or more defined/configured conditions have been met. Next, in one or more of the various embodiments, control may be returned to a calling process.

Figure 9:
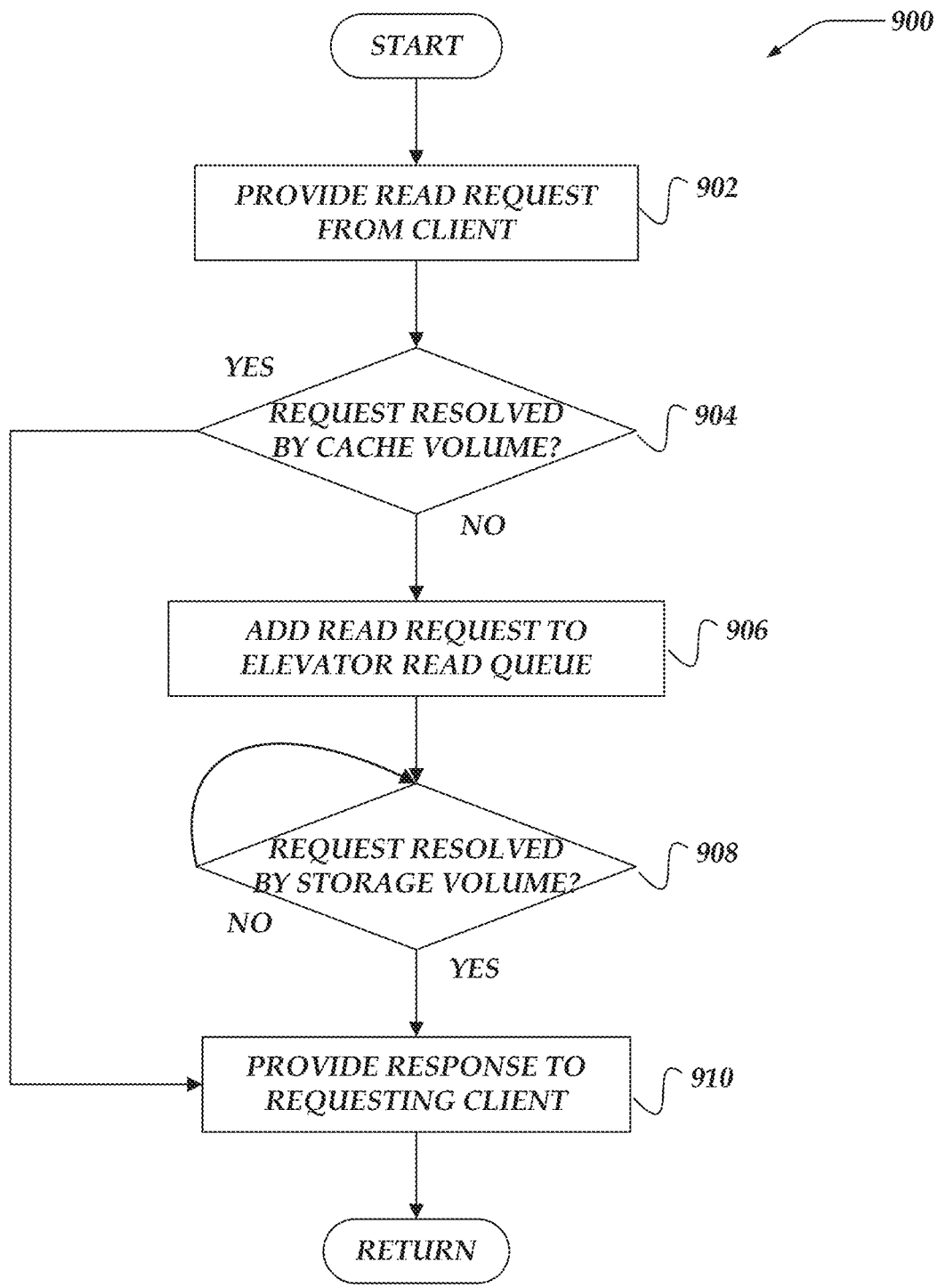
FIG. 9 illustrates an overview flowchart for a process for processing read requests for serverless disk drives based on cloud storage in accordance with one or more of the various embodiments

FIG. 9 illustrates an overview flowchart for process 900 for processing read requests for serverless disk drives based on cloud storage in accordance with one or more of the various embodiments. After a start flowchart block, at flowchart block 902, in one or more of the various embodiments, one or more read requests may be provided to a file system storage node by one or more clients. As described above, file system clients may provide one or more read requests to read data from the file system. In some embodiments, read requests may include information such as identifiers of the requesting clients, address locations of data to read, or the like. One of ordinary skill in the art will appreciate that read requests may include other information depending on the file system or the request. However, the client ID and location address information may be considered sufficient for describing the innovations disclosed herein. Accordingly, for brevity and clarity additional information regarding the make up of read request is omitted.

At decision flowchart block 904, in one or more of the various embodiments, if the read request may be resolved from a cache volume, control may flow to flowchart block 910; otherwise, control may flow to flowchart block 906. As described above, storage node may be configured to employ cache tiers based on page blobs. Accordingly, in some embodiments, elevator engines may be arranged to determine if the requested data may be stored in the cache tier.

At flowchart block 906, in one or more of the various embodiments, elevator engines may be arranged to associate the read request with a read job in the read request queue. In some embodiments, if there is not an appropriate read job in the read queue, elevator engines may be arranged to create a new read job and add it to the read queue. As described above, jobs may be associated with buckets. Thus, in some embodiments, read requests may be associated with jobs that are associated with buckets that map to the address ranges of the read requests.

At decision flowchart block 908, in one or more of the various embodiments, if the one or more read requests may be resolved by one or more storage volumes, control may flow to flowchart block 910; otherwise, elevator engines may be arranged to process other read requests in the read queue until the provided one or more read requests may be resolved. In some embodiments, if an error condition or timeout occurs, the one or more provided read requests may be abandoned and control may flow to flowchart block 910.

At flowchart block 910, in one or more of the various embodiments, file system engines may be arranged to provide one or more responses for the one or more read requests to the clients that made the request.

In some embodiments, in some cases, if an error condition or timeout occurred, the response may include an error code, notification, acknowledgment, or the like, to the clients that provided the requests.

In some embodiments, in some cases, if an error condition or timeout occurred, the response may include an error code, notification, acknowledgment, or the like, to the clients that provided the requests.

In some cases, underlying storage services provided by cloud computing environments may require reading more data than was requested. Thus, in some embodiments, file system engines may be arranged to populate the cache volume in 904 with the additional data.

Next, in one or more of the various embodiments, control may be returned to a calling process.

Figure 10:
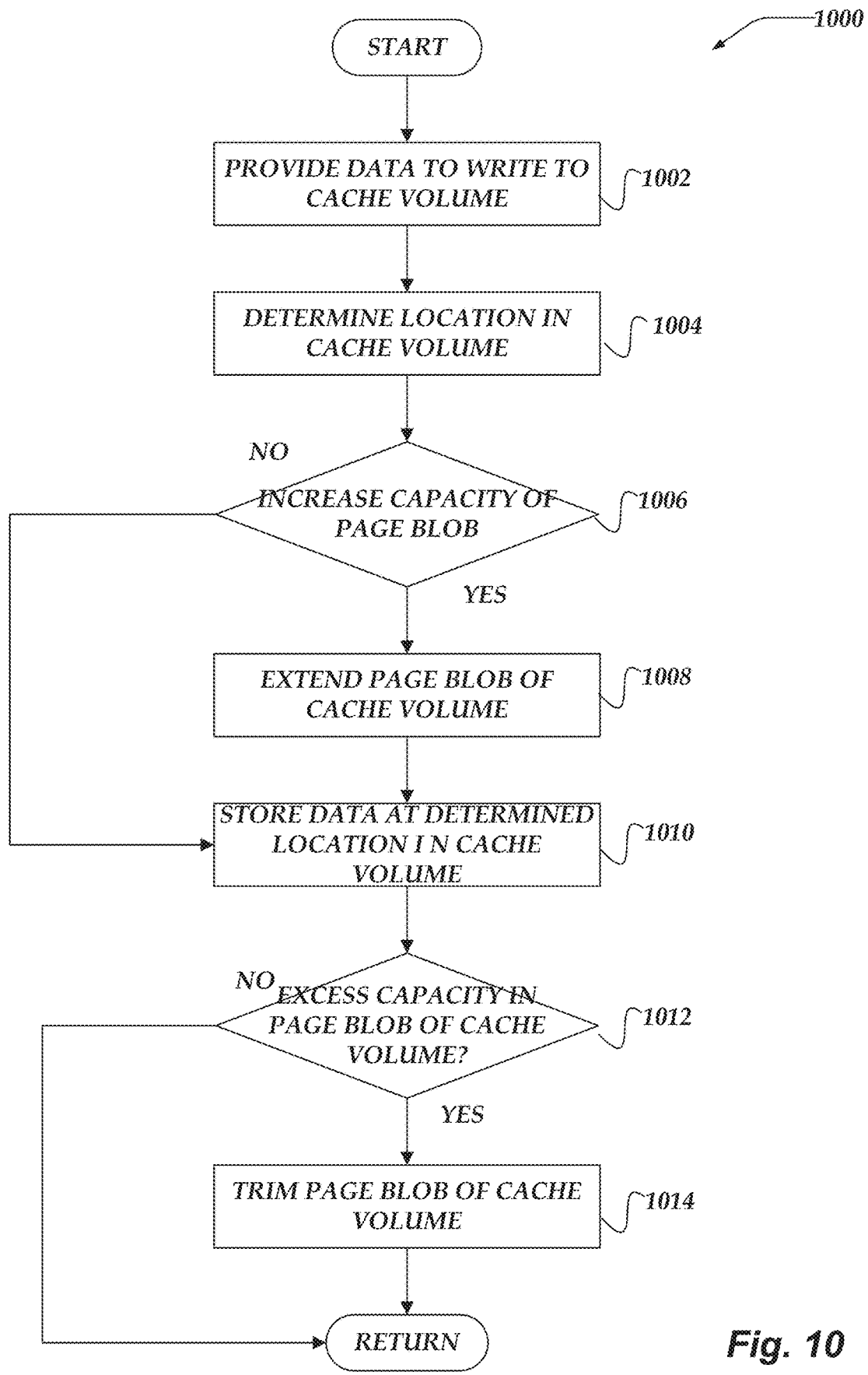
FIG. 10 illustrates a flowchart for a process for employing a cache tier based on serverless disk drives in a cloud computing environment in accordance with one or more of the various embodiments.

FIG. 10 illustrates a flowchart for process 1000 for employing a cache tier based on serverless disk drives in a cloud computing environment in accordance with one or more of the various embodiments. After a start flowchart block, at flowchart block 1002, in one or more of the various embodiments, file system engines may be arranged to provide data to an elevator engine on a storage node for writing to a cache volume. In one or more of the various embodiments, file system engines may be arranged to determine if data should be written to the cache storage of a storage node using one or more cache management strategies. For brevity and clarity, a description of the caching algorithms or cache management strategy is not discussed herein. However, one of ordinary skill in the art will appreciate that file systems may employ a variety of cache management strategies while not departing from the scope of the innovations described herein. In this context, it is sufficient to observe that a file system engine has determined that some data should be written to cache storage—the reason for the caching or how the determination is made is not within the scope of these innovations.

At flowchart block 1004, in one or more of the various embodiments, elevator engines may be arranged to determine a location in a cache volume for storing the provided data. Also, in some embodiments, file system engines may be arranged to determine the locations for storing the data using cache management.

In one or more of the various embodiments, elevator engines or file system engines may be arranged to prefer locations that have lower addresses over locations with higher addresses. In one or more of the various embodiments, this may cause data in the cache to be concentrated at lower addresses. Also, in some embodiments, this may enable the use of smaller volumes for longer and may reduce data movement if the volume may be selected for shrinking.

At decision flowchart block 1006, in one or more of the various embodiments, if the capacity of the cache storage needs to be increased, control may flow to flowchart block 1008; otherwise, control flow to flowchart block 1010.

In one or more of the various embodiments, a cache volume for a storage node may represent a range of locations or capacity that exceeds that currently allocated page blob that provides the underlying storage for the cache volume. Accordingly, in some embodiments, data being written to cache volume may be assigned an address that does have underlying storage space allocated from the cloud computing environment.

At flowchart block 1008, in one or more of the various embodiments, elevator engines may be arranged to expand the capacity of the cache volume. In one or more of the various embodiments, elevator engines may be arranged to employ one or more APIs provided by cloud computing environments to increase the size of the page blob providing the storage for the cache volume. In one or more of the various embodiments, elevator engines may be arranged to determine an amount to increase page blobs based on one or more of the amounts of data being written, a fixed/defined amount of increase, a dynamic amount of increase based on one or more conditions or metrics, or the like. Accordingly, in some embodiments, elevator engines may be arranged to employ rules, conditions, instructions, or the like, provided via configuration information to determine the amount to increase the size of the page blob.

In one or more of the various embodiments, increasing the size of the page blob may add storage space to the end of the page blob opening up locations with higher addresses. Thus, in some embodiments, data already stored in the page blob at locations at lower addresses may remain undisturbed.

At flowchart block 1010, in one or more of the various embodiments, elevator engines may be arranged to store the data at the determined location in the cache storage. In one or more of the various embodiments, elevator engines may be arranged to employ one or more APIs or interfaces provided by the cloud computing environment to store the data in the page blob that may be providing the storage for the cache volume of the storage node.

At flowchart block 1012, in one or more of the various embodiments, if there may be excess capacity in the cache volume, control may flow to flowchart block 1014; otherwise, control may be returned to a calling process.

In one or more of the various embodiments, elevator engines may be arranged to monitor the storage utilization of page blobs used in cache volumes. Accordingly, in some embodiments, if a sufficient amount of the page blob may be unused, elevator engines may be arranged to employ one or more APIs provided by the cloud computing environment to reduce the size of the page blob. Note, in some embodiments, page blobs may be trimmed from the back (higher addresses) to the front (lower addresses). For example, if the page blob is 1000 MB with but only the first 500 MB includes cached data, the elevator engine may trim the bottom 500 MB of the page blob to reduce its size.

At flowchart block 1014, in one or more of the various embodiments, elevator engines may be arranged to trim the page blob of cache volume. In one or more of the various embodiments, elevator engines may be arranged to employ one or more APIs or interfaces provided by cloud computing environments to decrease the size of the page blob providing the storage for the cache tier.

In one or more of the various embodiments, elevator engines may be arranged to determine an amount to decrease the page blobs based on one or more of a fixed/defined size of increase, a dynamic size of increase based on one or more conditions or metrics, or the like. Accordingly, in some embodiments, elevator engines may be arranged to employ rules, conditions, instructions, or the like, provided via configuration information to determine how much to increase the page blob. Note, in some embodiments, elevator engines may be arranged to trim the end of the page blobs up until it reaches a location that is storing cached data.

Next, in one or more of the various embodiments, control may be returned to a calling process.

Figure 11:
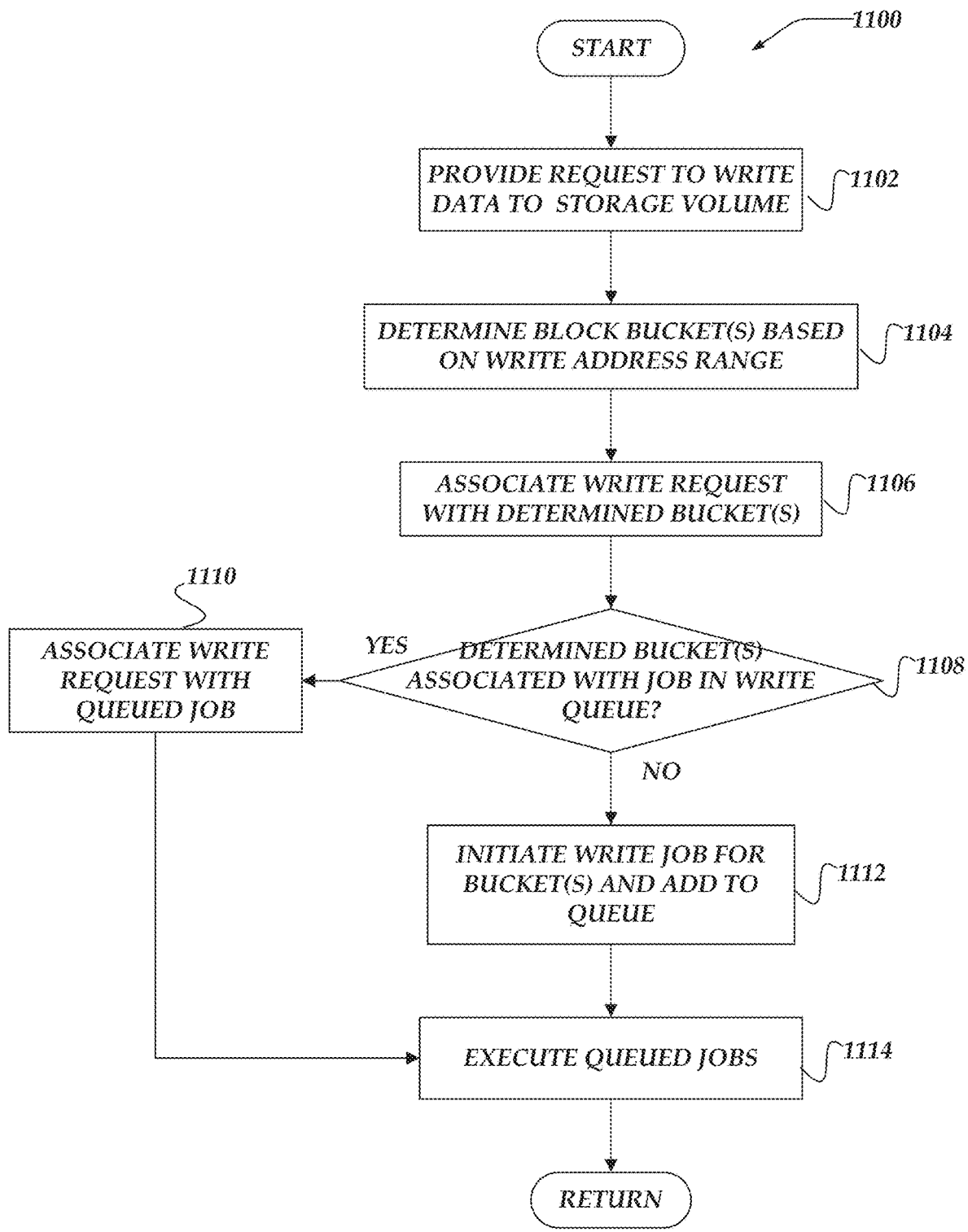
FIG. 11 illustrates a flowchart for a process for employing block storage volumes based on serverless disk drives in a cloud computing environment in accordance with one or more of the various embodiments.

FIG. 11 illustrates a flowchart for process 1100 for employing block storage volumes based on serverless disk drives in a cloud computing environment in accordance with one or more of the various embodiments. After a start flowchart block, at flowchart block 1102, in one or more of the various embodiments, file system engines may be arranged to provide one or more requests to write data to an elevator engine of a storage node. In one or more of the various embodiments, file system engines may be arranged to determine if the request should be resolved from a storage volume associated with the storage node. In some embodiments, the write request may be directly related to a request from a client of the file system. In some cases, the write request may be related to one or more administrative operations of the file system, such as, cache management, or the like.

At flowchart block 1104, in one or more of the various embodiments, elevator engines may be arranged to determine one or more block buckets (e.g., buckets) based on the write location, amount of data, or the like. In some embodiments, the write requests may include a range of addresses, the data being written, write size, or the like, that enables the elevator engine to determine one or more buckets that correspond to one or more block blobs or data blocks within the blobs that comprise the storage volume.

In one or more of the various embodiments, buckets may be configured to have a specific size. For example, in some embodiments, buckets may be 4 MB while block blobs for each storage volume sector are 1 TB. Accordingly, in some embodiments, each bucket may be mapped to a portion of the address space of a storage volume. For example, the first bucket may map to the first 4 MB of the storage volume, the second bucket may map to the second 4 MB of the storage volume, and so on. Thus, in some embodiments, address ranges associated write requests may be employed to determine the bucket that write requests may be associated with.

At flowchart block 1106, in one or more of the various embodiments, elevator engines may be arranged to associate the one or more write requests with the determined buckets. In one or more of the various embodiments, buckets may be associated with multiple write requests that each are associated with address ranges that fall within the address range corresponding to the bucket.

At decision flowchart block 1108, in one or more of the various embodiments, if the determined buckets may already be associated with a job in the write queue, control may flow to flowchart block 1110; otherwise, control may flow to flowchart block 1112. In one or more of the various embodiments, elevator engines may be arranged to check if the bucket associated with a write request may already be associated with a write job in the write job queue. For example, a previously received write request may be requesting to write data to another portion of the same write bucket. Thus, in this example, the write bucket that is associated with the newly provided write request may already be associated with a job in the job queue.

At flowchart block 1110, in one or more of the various embodiments, elevator engines may be arranged to associate the one or more write requests with the write job in the write queue.

At flowchart block 1112, in one or more of the various embodiments, elevator engines may be arranged to initiate a new write job for the determined buckets and add them to the queue. In one or more of the various embodiments, elevator engines may be arranged to order write jobs in the queue based on the address range of the bucket that may be associated with the job.

In some embodiments, if elevator engines may be arranged to prioritize storing data at locations with lower addresses, it may be advantageous to prioritize write buckets representing lower addresses over buckets representing at higher addresses. At least one reason this may be advantageous is because if the data density at lower addresses is greater than the data density at higher address, more write requests may occur for data at lower addresses which may increase the likelihood that write buckets may be filled before their associated job is executed.

At flowchart block 1114, in one or more of the various embodiments, elevator engines may be arranged to execute the queued write jobs. In one or more of the various embodiments, elevator engines may be arranged to employ one or more APIs provided by cloud computing environments to execute the write jobs. In one or more of the various embodiments, executing the write job will write an entire bucket to its corresponding block blob.

Next, in one or more of the various embodiments, control may be returned to a calling process.

Figure 12:
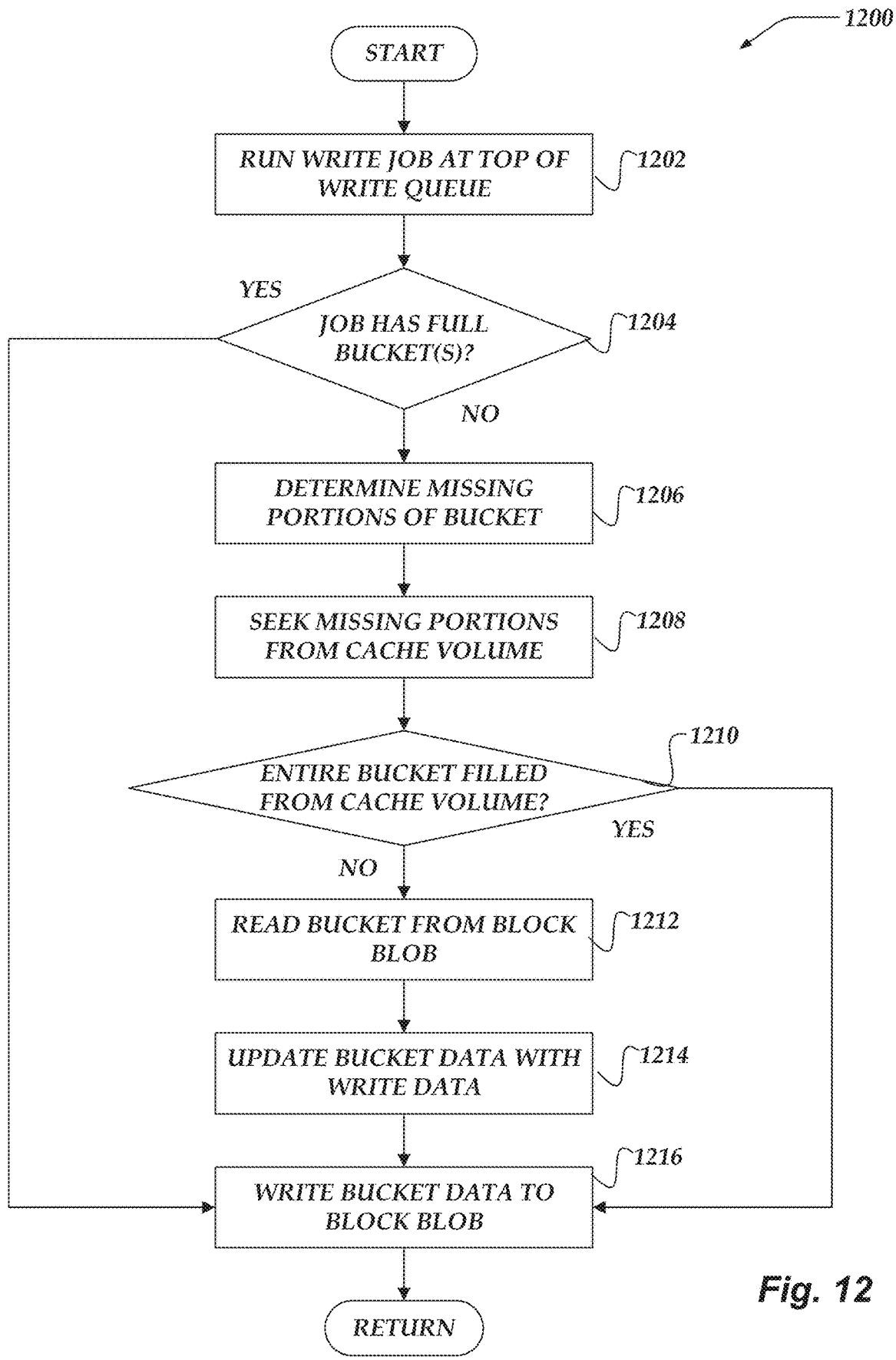
FIG. 12 illustrates a flowchart for a process for processing block storage write jobs for serverless disk drives based on cloud storage in accordance with one or more of the various embodiments.

FIG. 12 illustrates a flowchart for process 1200 for processing block storage write jobs for serverless disk drives based on cloud storage in accordance with one or more of the various embodiments. After a start flowchart block, at flowchart block 1202, in one or more of the various embodiments, elevator engines may be arranged to run the write job that may be at the top of the write queue. As described above, write requests may be bundled or batched into buckets. Thus, in some embodiments, additional write requests may have been associated with the write job while the write job is in the queue.

Accordingly, in some embodiments, if a write job may be at the top of the queue, elevator engines may begin to execute the write job.

At decision flowchart block 1204, in one or more of the various embodiments, if the job is associated with completed/full buckets, control may flow to flowchart block 1216; otherwise, control may flow to flowchart block 1206.

In one or more of the various embodiments, elevator engines may be arranged to write entire buckets to block blobs. Accordingly, in some embodiments, data associated with the write requests may replace/overwrite existing data on block blobs at the locations that are being written to. This is conventional write behavior. Thus, in some embodiments, if the write requests associated with the write job fill the entire bucket, the data being written may correctly overwrite the current data in the block blob at the locations that correspond to the bucket.

However, in one or more of the various embodiments, if the write requests associated with the write job do not fill the entire bucket, additional steps may be performed.

At flowchart block 1206, in one or more of the various embodiments, elevator engines may be arranged to determine one or more missing portions of the one or more buckets associated with the pending write job. In one or more of the various embodiments, elevator engines may be arranged to evaluate the write requests associated with a bucket to determine one or more portions of the bucket that may not be associated with a write request. For example, each write request is associated with an address range. Thus, in some embodiments, elevator engines may be arranged to identify one or more portions of the bucket that may not be associated with pending write requests. For example, if the write bucket corresponds to locations with addresses 5000-8999, one request to store data at 5000-8999 would fill the entire bucket. Likewise, multiple write requests, with address ranges such as, 5000-5500, 5501-6500, 6501-8999 would fill the entire bucket. In contrast, for example, if the write job included one write request with an address ranges of 5000-6000 and another write request with an address range of 7000-8999, the address range 6001-6999 would be considered a missing portion of the bucket. If a bucket that includes missing portions was written to a block blob, data on the block blob corresponding to the missing portions of the bucket would be destroyed because the entire bucket is written to the block blob, including portions of the bucket that are not associated with write requests.

At flowchart block 1208, in one or more of the various embodiments, elevator engines may be arranged to seek one or more missing portions from local cache storage. In some embodiments, elevator engines may be arranged to query the in memory cache system to find one or more portions of the data required to satisfy the request.

In one or more of the various embodiments, elevator engines may be arranged to determine if the missing portions of the bucket may be stored in the cache volume of the storage node. In some embodiments, elevator engines may be arranged to check cache volumes for data that has not been flushed from the cache volumes to storage volumes. In some cases, elevator engines may discover data in the cache that corresponds to a bucket about to be written to a block blob. Accordingly, in some embodiments, if data that fits in the bucket may be found in the cache volume, that data may be added to the bucket about to be written.

In one or more of the various embodiments, elevator engines may be arranged to to query whether the missing range is currently unused. Accordingly, in some embodiments, if the missing ranges of memory are determined to be unused by the file system, the range of missing data may be filled in with values, such as, Os, that indicate the range of memory is unused.

At decision flowchart block 1210, if buckets associated with the pending write jobs may be filled, control may flow to flowchart block 1216; otherwise, control may flow to flowchart block 1212. In one or more of the various embodiments, buckets that may be filled by write requests may be considered ready to write to their corresponding block blobs. In this context, a bucket may be considered filled if the entire address range represented by the bucket is associated with write requests.

At flowchart block 1212, in one or more of the various embodiments, elevator engines may be arranged to read one or more buckets from one or more block blobs. In one or more of the various embodiments, elevator engines may be arranged to read data for the pending write buckets. Accordingly, in some embodiments, elevator engines may read one or more buckets from the block blob such that each bucket corresponds to the same storage volume address range as the write bucket.

At flowchart block 1214, in one or more of the various embodiments, elevator engines may be arranged to update write buckets with data read from the block blobs. In one or more of the various embodiments, elevator engines may be arranged to fill in the missing portions of the write bucket with data read from the block blob. Or, alternatively, in some embodiments, elevator engines may be arranged to write the data being written to the bucket that was read from the block blob. In either case, the write bucket may be considered to be filled.

At flowchart block 1216, in one or more of the various embodiments, elevator engines may be arranged to write the write buckets to the block blobs. In one or more of the various embodiments, elevator engines may be arranged to employ one or more APIs provided by the cloud computing environment to write the write buckets to the block blob at the address that corresponds to the write buckets.

Next, in one or more of the various embodiments, control may be returned to a calling process.

Figure 13:
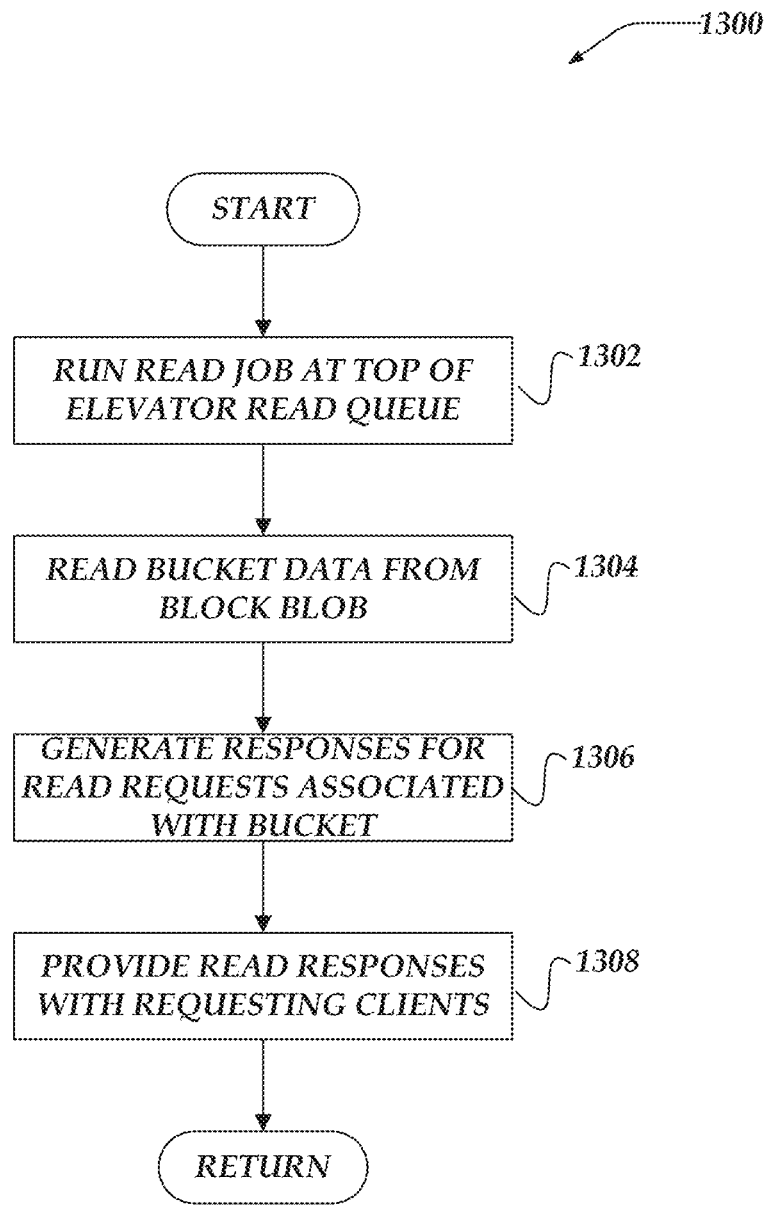
FIG. 13 illustrates a flowchart for a process for processing block storage read jobs for serverless disk drives based on cloud storage in accordance with one or more of the various embodiments.

FIG. 13 illustrates a flowchart for process 1300 for processing block storage read jobs for serverless disk drives based on cloud storage in accordance with one or more of the various embodiments. After a start flowchart block, at flowchart block 1302, in one or more of the various embodiments, elevator engines may be arranged to run the read job that may be at the top of the read queue. In one or more of the various embodiments, elevator engines may be arranged to maintain a prioritized queue of read jobs that may be executed to obtain a bucket of data from a block blob.

In one or more of the various embodiments, elevator engines may be arranged to execute read jobs by performing one or more actions via one or more APIs for reading block blobs that may be provided by the cloud computing environment. One of ordinary skill in the art will appreciate that different cloud computing environments (or vendors) may provide different APIs for interacting with block blobs. Accordingly, in some embodiments, elevator engines may be arranged to employ rules, instructions, libraries, or the like, provided via configuration information to determine the specific actions for interacting with block blobs.

At flowchart block 1304, in one or more of the various embodiments, elevator engines may be arranged to read data for the buckets that may be associated with the read job from one or more block blobs. In one or more of the various embodiments, the buckets of data obtained from block blobs may correspond to a contiguous range of addresses that are within the range of addresses represented by the bucket. For example, if the bucket size for a file system is 4 MB, each bucket obtained from a block blob will include 4 MB of data. In some embodiments, this data may be retained to update the cache.

At flowchart block 1306, in one or more of the various embodiments, elevator engines may be arranged to generate one or more responses for the one or more read requests associated with the read job. In one or more of the various embodiments, as described above, read jobs provide an entire bucket of data. In some cases, the bucket may include data for more than one read request. For example, if a bucket has an address range of 5000-8999, a first read request for data at 5500-6000 and a second read request for data at 7000-7800 may both be serviced by the same read job.

At flowchart block 1308, in one or more of the various embodiments, elevator engines may be arranged to provide the one or more read responses to the one or more requesting clients. In one or more of the various embodiments, elevator engines may be arranged to distribute the data in the bucket to read requests based on the address locations of the read requests and the client identifiers associated with the read requests. Accordingly, in some embodiments, elevator engines may provide the read responses to file system engine to complete the delivery of the data to the requesting clients.

Next, in one or more of the various embodiments, control may be returned to a calling process.

Figure 14:
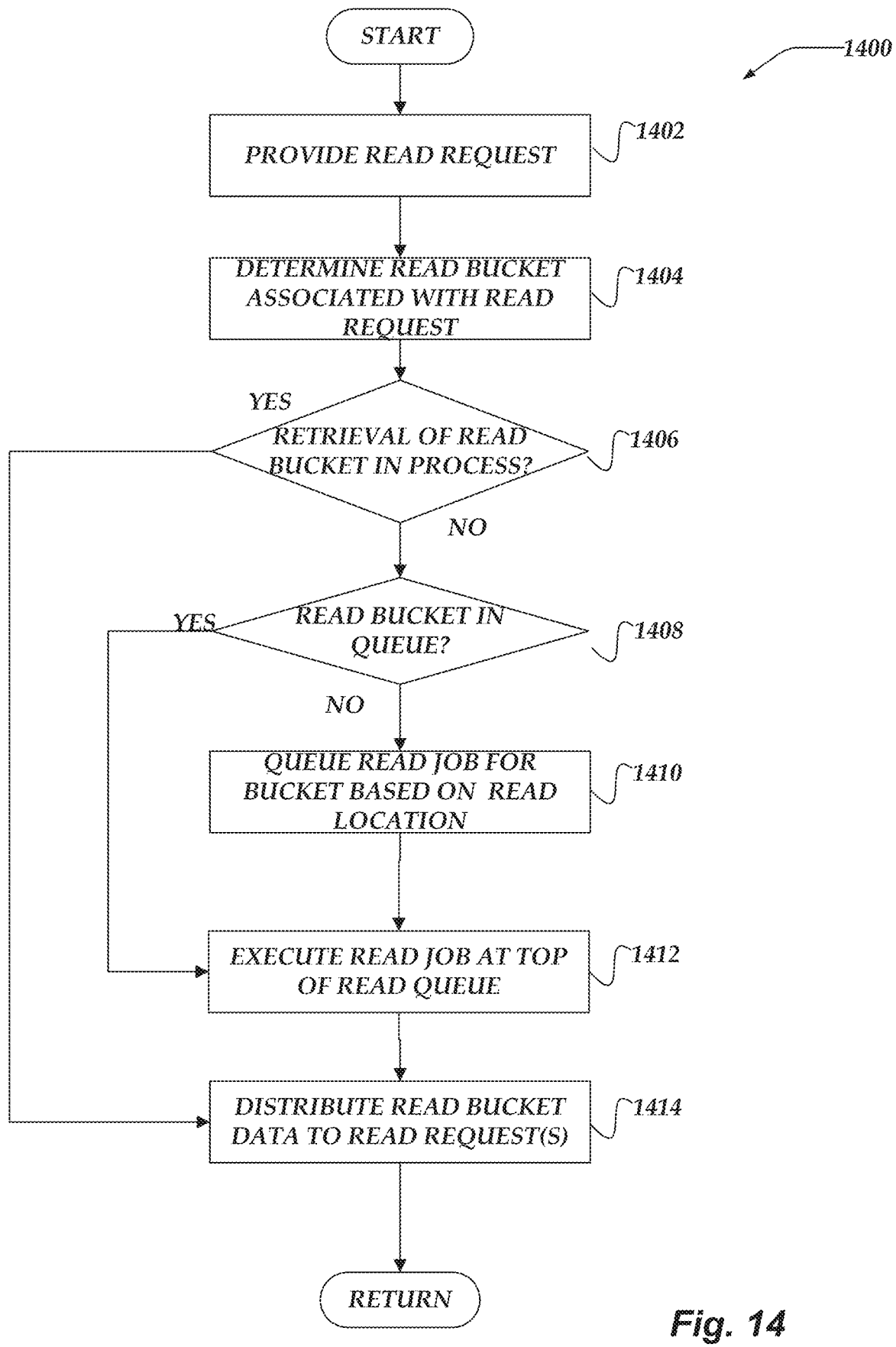
FIG. 14 illustrates a flowchart for a process for processing block storage read jobs for serverless disk drives based on cloud storage in accordance with one or more of the various embodiments.

FIG. 14 illustrates a flowchart for process 1400 for processing block storage read jobs for serverless disk drives based on cloud storage in accordance with one or more of the various embodiments. After a start flowchart block, at flowchart block 1402, in one or more of the various embodiments, one or more read requests may be provided to an elevator engine associated with storage node. As described above, file system clients may provide one or more read requests to read data from the file system. In some embodiments, read requests may include information such as identifiers of the requesting clients, address locations of data to read, or the like. One of ordinary skill in the art will appreciate that read requests may include other information depending on the file system or the request. However, the client ID and address location information may be considered sufficient for describing the innovations disclosed herein. Accordingly, for brevity and clarity additional information regarding the make up of read request is omitted.

At flowchart block 1404, in one or more of the various embodiments, the elevator engine may be arranged to determine a read bucket to associate with the read request. In one or more of the various embodiments, ranges of storage volume addresses may be mapped to read buckets. Accordingly, in some embodiments, elevator engines may be arranged to determine the appropriate read bucket based on addresses included with the read request.

At decision flowchart block 1406, in one or more of the various embodiments, if the read bucket may be associated with a pending read job, control may flow to flowchart block

1414; otherwise, control may flow to decision flowchart block 1408. In one or more of the various embodiments, elevator engines may be arranged to execute read jobs that read an entire bucket from block blobs. In some cases, a read job that is fetching the read bucket associated with a read request may have been executed before the read request is added to the read job. In some embodiments, if the pending read job finishes, the information requested by the read request may be obtained. Accordingly, in some embodiments, elevator engines may be arranged to fill pending read request with data that will be returned by the pending job rather than initiating and queuing another read job.

At decision flowchart block 1408, in one or more of the various embodiments, if the read bucket may be associated with a read job currently in the read queue, control may flow flowchart block 1412; otherwise, control may flow to flowchart block 1410.

In one or more of the various embodiments, elevator engines may be arranged to queue read jobs that read an entire bucket from a block blob. In some embodiments, elevator engines may be arranged to scan the read queue to determine if the bucket associated with the read request may be associated with a queued read job.

At flowchart block 1410, in one or more of the various embodiments, the elevator engine may be arranged to queue a read job for the read bucket based on the addresses of the data associated with the bucket associated with the read request. In one or more of the various embodiments, elevator engines may be arranged to generate a new read job because the bucket associated with the read request is not associated with another queued read job.

At flowchart block 1412, in one or more of the various embodiments, the elevator engine may be arranged to execute the read job at the top of the read queue. In one or more of the various embodiments, elevator engines may be arranged to execute each read job to obtain a bucket of data from the block blob that corresponds to the address range of the bucket.

At flowchart block 1414, in one or more of the various embodiments, the elevator engine may be arranged to distribute the data in the read bucket(s) to the one or more read requests. In one or more of the various embodiments, each bucket retrieved from a block blob may include data for several read requests. Accordingly, in some embodiments, elevator engines may be arranged to distribute the data in the read bucket to the individual read requests that were associated with the bucket.

Next, in one or more of the various embodiments, control may be returned to a calling process.

Figure 15:
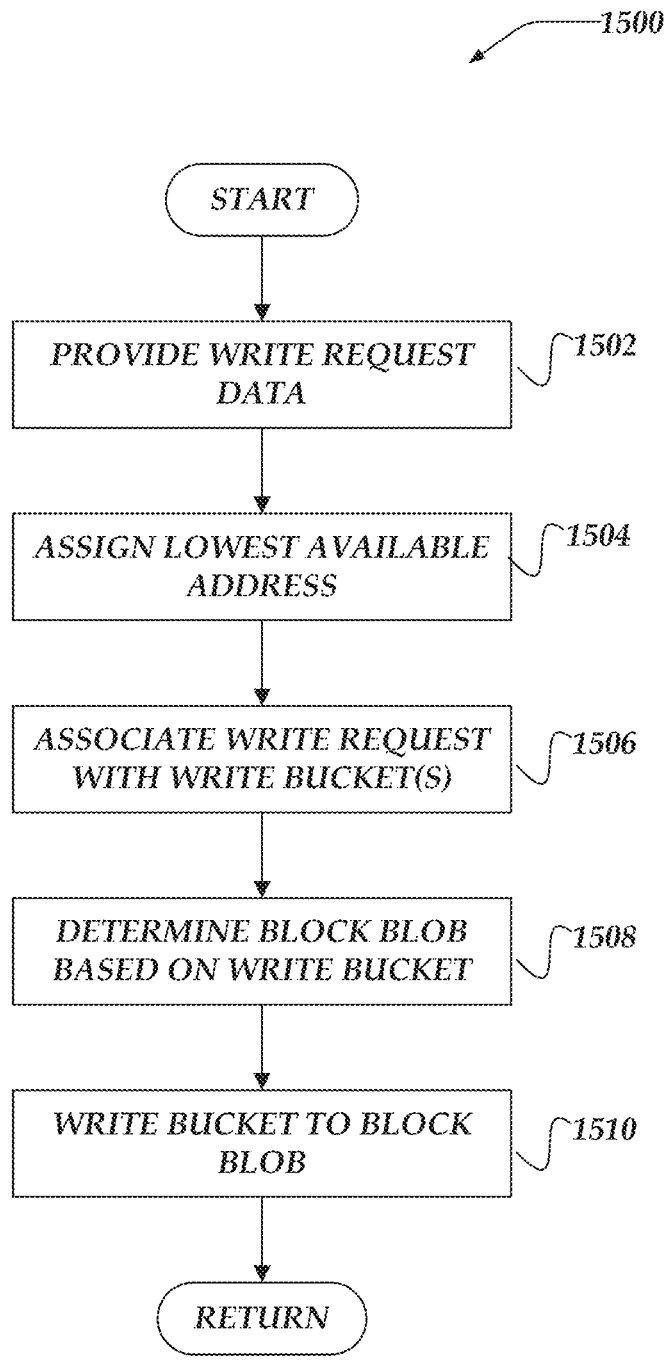
FIG. 15 illustrates a flowchart for a process for processing block storage write jobs for serverless disk drives based on cloud storage in accordance with one or more of the various embodiments.

FIG. 15 illustrates a flowchart for process 1500 for processing block storage write jobs for serverless disk drives based on cloud storage in accordance with one or more of the various embodiments. After a start flowchart block, at flowchart block 1502, in one or more of the various embodiments, data associated with a write request may be provided to an elevator engine associated with storage node. As described herein, write requests may be provided to storage nodes. In some embodiments, write requests may be provided by various file system clients that have access to the file system.

At flowchart block 1504, in one or more of the various embodiments, elevator engines or file system engines may be arranged to assign addresses of lowest available location in the block storage volume to the data being written. In some embodiments, elevator engines or file system engines may be arranged to assign the addresses to store the data being written. In some embodiments, this may include determining a storage volume as well. For example, for some embodiments, a write request may expect the file system to store data included or referenced by the write request and report the location where the data is stored in an acknowledgment message, or the like.

Accordingly, in one or more of the various embodiments, elevator engines or file system engines may be arranged to determine the lowest available address range to assign to the data being written. In this context, a lowest address is an address of a location that is closest to the beginning of the address range represented by a storage volume. For example, if a storage volume provides an address range of 0 through 100 TB, address 0 may be considered the lowest address.

In one or more of the various embodiments, elevator engines or file system engines may be arranged to track the storage volume addresses that are unassociated with stored data. Note, one of ordinary skill in the art will appreciate that a variety of data structures may be employed to track free/unused portions of a storage volume. Likewise, in some embodiments, data structures may be used to track locations in storage volumes that are used to store data.

Accordingly, in some embodiments, elevator engines or file system engines may be arranged to evaluate a free list to determine the lowest address that may store the data associated with the write request.

At flowchart block 1506, in one or more of the various embodiments, elevator engines or file system engines may be arranged to associate the write request with the write buckets corresponding to the determined address range. In one or more of the various embodiments, one or more buckets may be associated with the data being written. As described above, in some embodiments, elevator engines or file system engines may be arranged to write or read chunks of data from block blobs using fixed size buckets. Accordingly, in some embodiments, elevator engines or file system engines may determine to one or more buckets that correspond to the address ranges for the write request and associate the write request with the determined write buckets.

At flowchart block 1508, in one or more of the various embodiments, elevator engines or file system engines may be arranged to determine the block blob in storage volumes based on the write bucket. As described above, in some embodiments, block blobs may be mapped to specific address ranges in the storage volume (storage volume sectors). Accordingly, in some embodiments, the addresses associated with the write bucket or the write request may be employed to determine the storage volume sector and block blob for storing the data provided by the write request.

At flowchart block 1510, in one or more of the various embodiments, elevator engines or file system engines may be arranged to write the write bucket to the determined block blob. Note, as described above, elevator engines or file system engines may be arranged to instantiate write jobs that may be queued in write queues. Thus, in some cases, for some embodiments, the write bucket(s) associated with the write request may be associated with a queued write job. In other cases, for some embodiments, the elevator engine or file system engine may generate a new write job for executing the write job.

Next, in one or more of the various embodiments, control may be returned to a calling process.

Figure 16:
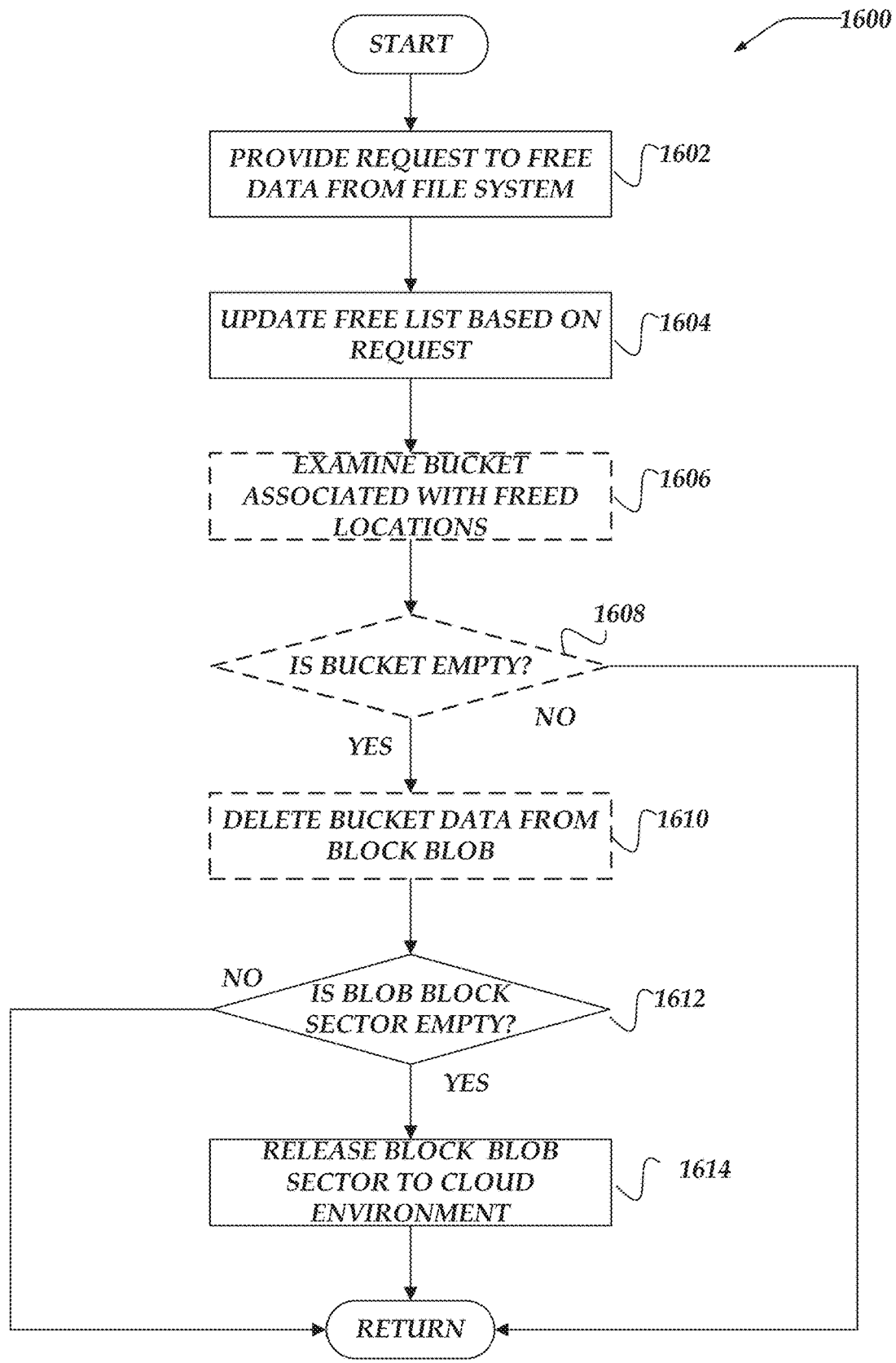
FIG. 16 illustrates a flowchart for a process for managing storage volumes for serverless disk drives based on cloud storage in accordance with one or more of the various embodiments.

FIG. 16 illustrates a flowchart for process 1600 for managing storage volumes for serverless disk drives based on cloud storage in accordance with one or more of the various embodiments. After a start block, at flowchart block

1602, in one or more of the various embodiments, file system engines may provide storage nodes requests to free or delete file system data. In one or more of the various embodiments, file system clients may provide requests to delete data from the file systems. Also, in some embodiments, one or more administrative processes or maintenance jobs directed by file system engines may provide delete requests to delete data from the file system. In one or more of the various embodiments, delete requests may include at least a range of addresses to delete from a storage volume. The range of addresses to delete may be expressed as one or more of a start location and stop location, start location and a run-length, start location and data size, or the like. Note, one of ordinary skill in the art will appreciate that delete requests may include other information, such as, timestamps, client IDs, permission/authorization information, encryption information, or the like. For brevity and clarity this other information is not discussed here.

At flowchart block 1604, in one or more of the various embodiments, elevator engines may be arranged to update a free list based on the delete request. In one or more of the various embodiments, elevator engines or file system engines may be arranged to track the addresses of locations in storage volumes that may be unassociated with stored data. Accordingly, in some embodiments, the address range associated with the delete request may be marked as free or otherwise unused.

Note, one of ordinary skill in the art will appreciate that a variety of data structures may be employed to track free/unused portions of a storage volume. Likewise, in some embodiments, data structures may be used to track locations in storage volume that are used to store data. Various free list data structures may be employed without departing from the scope the innovations detailed herein.

At flowchart block 1606, in one or more of the various embodiments, optionally, elevator engines may be arranged to evaluate the bucket associated with the free locations.

In one or more of the various embodiments, elevator engines may be arranged to determine the bucket associated with delete request based on the address range associated with the delete request.

In one or more of the various embodiments, elevator engines may be arranged to check the free list to determine if all the locations associated with the bucket are free.

Note, this flowchart block is marked as optional because in some embodiments buckets may not be employed for delete. For example, a file system may be configured to implement deletes by marking the relevant location in the free list as free and not explicitly removing the data from block blobs using buckets.

At decision flowchart block 1608, in one or more of the various embodiments, optionally, if the bucket is indicated as being free, control may flow to flowchart block 1610; otherwise, control may be returned to a calling process.

Note, this flowchart block is marked as optional because in some embodiments buckets may not be employed for delete request. For example, a file system may be configured to implement deletes by marking the relevant location in the free list as free and not explicitly removing data from block blobs using buckets.

At flowchart block 1610, in one or more of the various embodiments, optionally, elevator engines may be arranged to delete the data associated with the empty bucket from the block blob.

Note, this flowchart block is marked as optional because in some embodiments buckets may not be employed for delete request. For example, a file system may be configured to implement deletes by marking the relevant location in the free list as free rather than explicitly removing deleted data from block blobs using buckets.

At decision flowchart block 1612, in one or more of the various embodiments, if the block blob associated with a sector of the storage volume is empty, control may flow to flowchart block 1614; otherwise, control may be returned to a calling process.

In one or more of the various embodiments, elevator engines may be arranged to monitor storage volume sectors and their corresponding block blobs to determine if a block blob for a storage volume sector may be empty or otherwise unused. In some embodiments, elevator engines may be arranged to scan the free list to determine if all address associated with a storage volume sector may be marked as empty. Also, in some embodiments, elevator engines may be arranged to track in real-time storage metrics associated with storage volume sectors. Thus, in one or more of the various embodiments, elevator engines may be arranged to evaluate storage volume sector metrics to determine if a storage volume sector may be empty or otherwise unused.

At flowchart block 1614, in one or more of the various embodiments, elevator engines may be arranged to release the empty block blob to the cloud computing environment.

In one or more of the various embodiments, elevator engines may be arranged to employ one or more APIs provided by the cloud computing environment to release one or more empty block blobs. In one or more of the various embodiments, released block blobs may be considered irrevocably discarded such that the file system may no longer be considered to have access to the deleted block blob or the data stored on the block blob.

In one or more of the various embodiments, releasing block blobs may reduce the charges a cloud computing environment charges to a file system operator because the released block blobs are no longer allocated to the file system or the file system operator. Note, the specific impact on pricing or storage costs may depend on the current pricing features of the cloud computing environments.

Next, in one or more of the various embodiments, control may be returned to a calling process.

Figure 17:
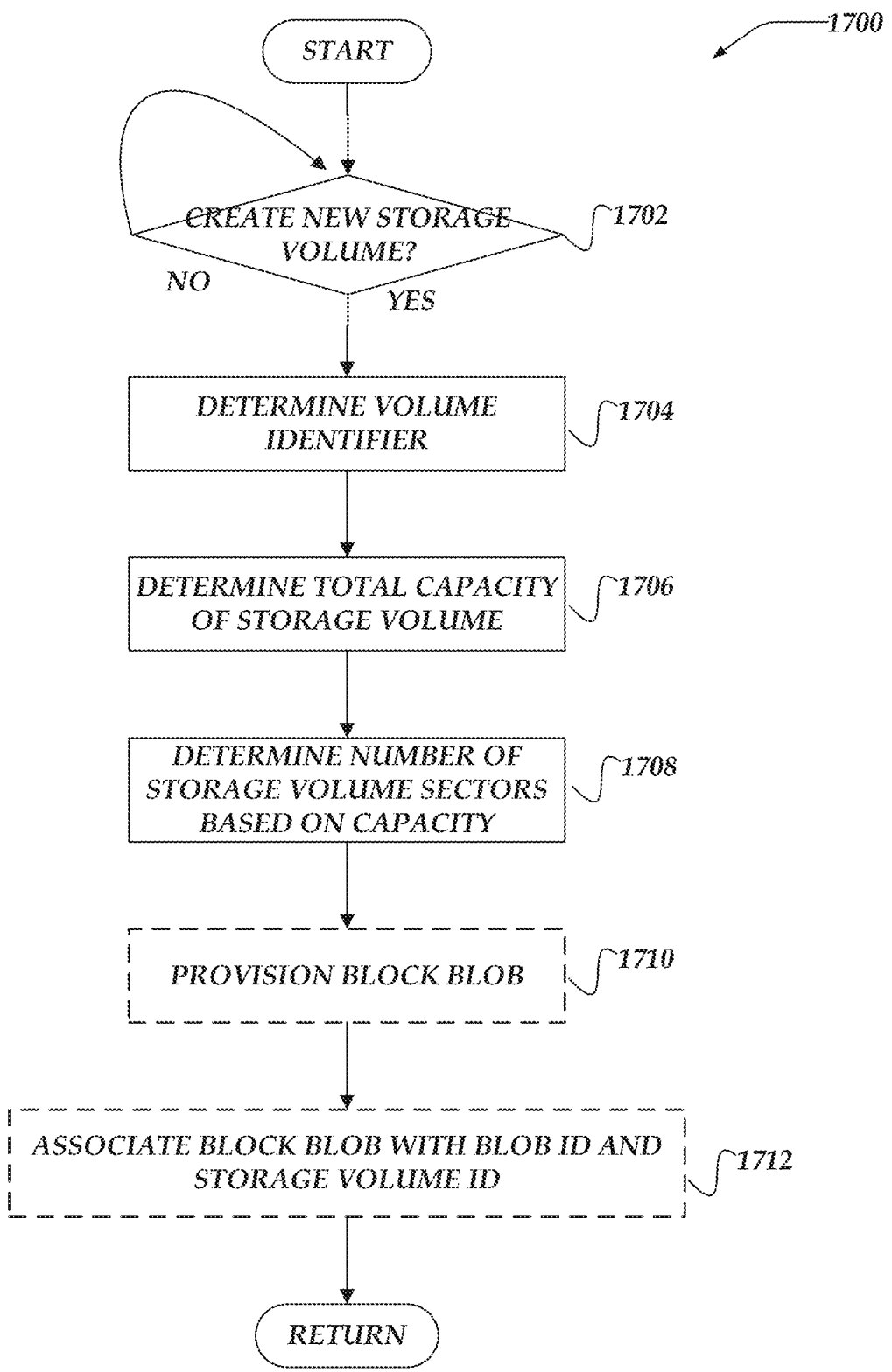
FIG. 17 illustrates a flowchart for a process for instantiating block storage volumes for serverless disk drives based on cloud storage in accordance with one or more of the various embodiments.

FIG. 17 illustrates a flowchart for process 1700 for instantiating block storage volumes for serverless disk drives based on cloud storage in accordance with one or more of the various embodiments. After a start flowchart block, at flowchart decision block 1702, in one or more of the various embodiments, if a new storage volume may be instantiated, control may flow to flowchart block 1704; otherwise, control may loop back to flowchart decision block 1702.

In one or more of the various embodiments, file system engines may be arranged to create new storage volumes for storage nodes based on the occurrence of one or more conditions. For example, upon initial deployment of new file systems or new storage nodes, new storage volumes may be required. Likewise, in some embodiments, file system engines may be arranged to employ rules, instructions, or the like, provided via configuration information to determine if new storage volumes may be created. For example, in some embodiments, a file system may be configured to automatically expand storage capacity before one or more particular client applications or client operations are executed. For example, for some embodiments, a file system user may schedule jobs that require a larger than usual amount of storage to run during certain times. Thus, for this example, a file system engine may be configured to automatically add additional storage nodes or storage volumes at certain times.

At flowchart block 1704, in one or more of the various embodiments, file system engines or elevator engines may be arranged to determine an identifier for the new storage volume. In one or more of the various embodiments, file systems may be configured to declare names or identifiers that identify the file system or file system cluster. Likewise, in some embodiments, file system engines may be arranged to associate names or identifiers with each storage node and storage volume in the cluster. For example, if the file system name is fs1, fs1-n1 and fs1-n2 may be identifiers for two storage nodes in the fs1 cluster. Likewise, for example fs1-n1-sv1 may be an example of an identifier for a storage volume (sv1) for a storage node (n1) in the file system (fs1). One of ordinary skill in the art will be familiar with the APIs, interfaces, tagging support, or the like, that various cloud computing environments may provide for associating identifiers (tags) with objects (e.g., compute instances, page blobs, block blocks, or the like) in cloud computing environments.

At flowchart block 1706, in one or more of the various embodiments, file system engines or elevator engines may be arranged to determine the capacity of the new storage volume.

In one or more of the various embodiments, file system engines may be configured with storage volume capacities. Accordingly, in some embodiments, storage volume capacity values may be stored in configuration information that may be accessible to file system engines. For example, for some embodiments a file system may be configured to have four storage nodes each with two 100 TB storage volumes where the configuration values are stored in configuration information associated with the file system.

At flowchart block 1708, in one or more of the various embodiments, elevator engines may be arranged to determine a number of storage volume sectors for the storage volume based on the determined capacity of the storage volume.

In one or more of the various embodiments, storage volume sectors represent a range of addresses in the storage volume that each may correspond to a block blob. In one or more of the various embodiments, block blobs provided by cloud computing environments may be restricted or optimized to particular sizes. Accordingly, in some embodiments, file system engines may determine the storage volume sector size based on the block blob size. Likewise, in some embodiments, file system engines may be arranged to determine block blob size based on configuration information to account for local requirements or local circumstance. For example, in some embodiments, a file system engine or elevator engine may determine each block blob for a storage volume should be 1 TB based on configuration information. Accordingly, in some embodiments, storage volume sector size may also be set to 1 TB such that each storage volume sector represents a range of storage volume addresses that equal to a 1 TB portion of the storage volume capacity.

Accordingly, in some embodiments, elevator engines may determine one or more storage volume sectors for the new storage volume based on the number of block blobs it would take to provide data storage for the storage volume. In one or more of the various embodiments, each storage volume sector may be allocated a portion of the address space provided by the storage volume. For example, if the storage volume has a capacity of 100 TB, the first sector of the storage volume may correspond to the first 1 TB of the 100 TB storage volume, the second sector of the storage volume may correspond to the next 1 TB of the 100 TB storage volume, and so on.

At flowchart block 1710, in one or more of the various embodiments, optionally, elevator engines may be arranged to provision one or more block blobs from the cloud computing environment. In one or more of the various embodiments, elevator engines may be arranged to provision block blobs for storage volume sectors on-demand as they are needed for storing data in the storage volume. In some embodiments, storage volumes may include one or more file allocation tables, or other meta-data that may be initialized and stored in dedicated sector of the storage volume, such as, the first storage volume sector.

Accordingly, in some embodiments, at least one block blob may be provisioned to store the file system meta-data associated with the storage volume. Likewise, in some embodiments, elevator engines may be configured to provision one or more block blobs for storage volumes at the time the storage volume may be created. For example, if the user/client knows that a storage volume with 1 TB sectors will immediately be loaded with 20 TB of data, the elevator engines may be configured to automatically provision 20 1 TB block blobs to store data for the first 20 storage volume sectors at or near the time the storage volume is created.

Note, this flowchart block is indicated as being optional because in some embodiments provisioning of block blobs may be deferred until the storage volume is put into service or otherwise used for storing data.

At flowchart block 1712, in one or more of the various embodiments, optionally, elevator engines may be arranged to associate the one or more block blobs with the block storage volume identifier and a block blob number. In one or more of the various embodiments, elevator engines may be arranged to employ one or more APIs or interfaces provided by cloud computing environments to associate one or more identifiers with the provisioned block blobs. See, description of identifiers included for block 1704.

Note, this flowchart block is indicated as being optional because in some embodiments the actual provisioning of block blobs may be deferred until the block storage volume is put into service or otherwise used for storing data.

Alternatively, in one or more of the various embodiments, elevator engines may be arranged to assign identifiers to block blobs as they are provisioned during the course of the normal file system operations. Note, in some embodiments, the identifiers may be comprised of various formats or structure as long as they may be employed to query the cloud computing environment to obtain handles or references to the block blobs.

Next, in one or more of the various embodiments, control may be returned to a calling process.

Figure 18:
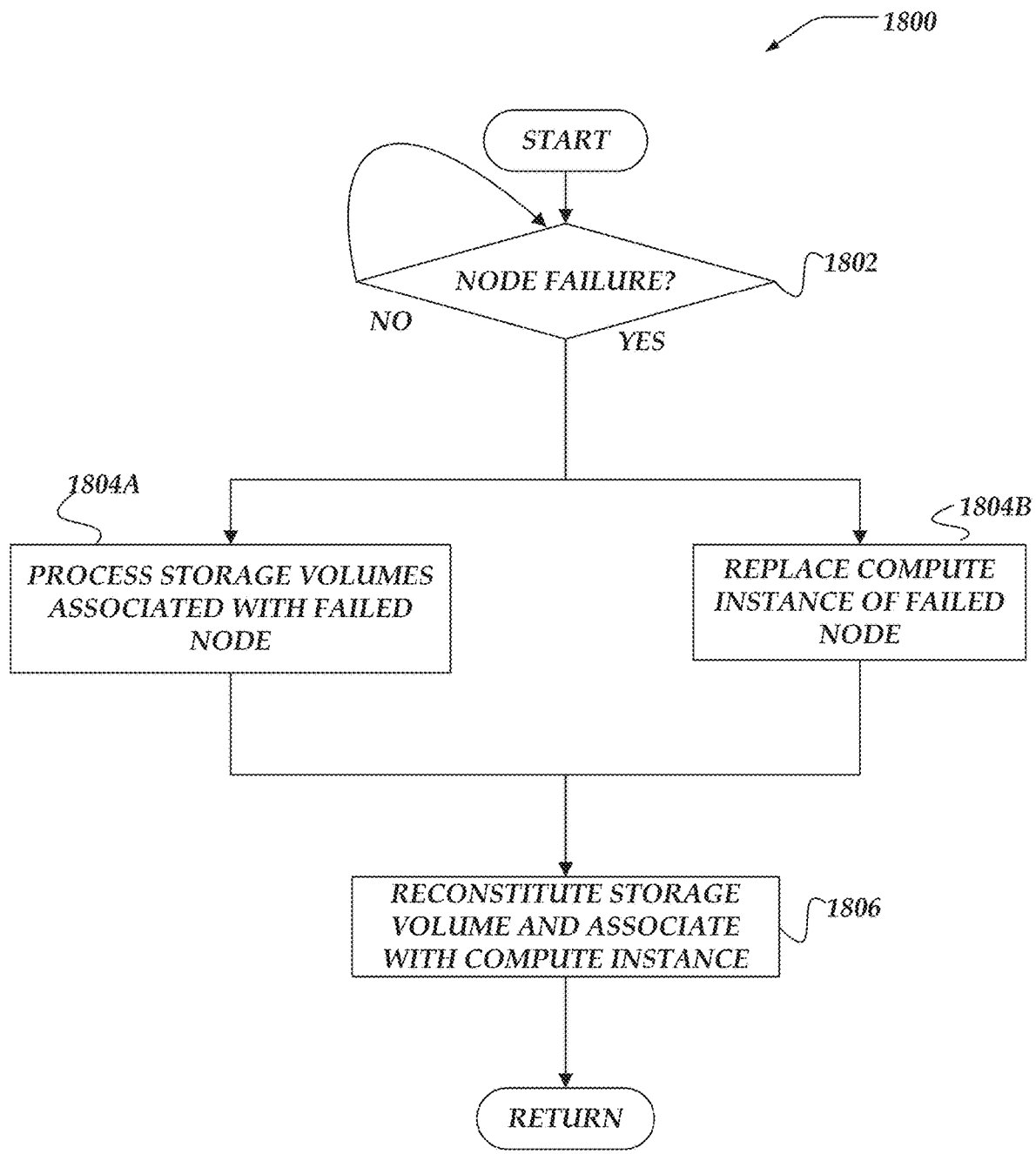
FIG. 18 illustrates a flowchart for a process for managing storage node failures in association with serverless disk drives based on cloud storage in accordance with one or more of the various embodiments.

FIG. 18 illustrates a flowchart for process 1800 for managing storage node failures in association with serverless disk drives based on cloud storage in accordance with one or more of the various embodiments. After a start flowchart block, decision flowchart block 1802, if there may be a storage node failure, control may flow to flowchart block 1804; otherwise, control may loop back to decision flowchart block 1802.

In one or more of the various embodiments, file system engines may be arranged to determine storage node failures based on a variety of conditions or metrics. In some embodiments, file system engines may employ a variety of methods to monitor the health of storage nodes, including, watchdog processes, periodic polling, monitoring performance metrics, or the like. In some embodiments, file system engines may be arranged to employ one or more rules, conditions, instructions, or the like, provided by configuration information to determine if a storage node may be considered failed.

For example, if a storage node does not acknowledge a request or other communications before the expiration of a timeout, a file system engine may consider the storage node to be a failed storage node.

At flowchart block 1804A, in one or more of the various embodiments, file system engines may be arranged to determine the one or more storage volumes associated with the failed storage node. In one or more of the various embodiments, file system engines may be arranged to include one or more data structures that track the identities or status or the compute instances, storage volumes, cache volumes, page blobs, block blobs, or the like, that may comprise a file system cluster. Thus, in some embodiments, file system engines or elevator engines may be arranged to determine the storage volumes associated with the failed storage node. For example, in some embodiments, file system engines may be arranged to maintain a database that includes the identifiers of the various compute instances, storage volumes, cache volumes, page blobs, block blobs, or the like, that comprise a file system. See, FIG. 19 for a more detailed description for processing storage volumes associated with a failed node.

Note, in some embodiments, file system engines may be arranged to execute one or more actions described in flowchart blocs 1804A and 1804B concurrently.

At flowchart block 1804B, in one or more of the various embodiments, file system engines may be arranged to replace the compute instance of the failed storage node.

In one or more of the various embodiments, file system engines may be arranged to provision one or more compute instances to replace the compute instances associated with failed storage nodes. Accordingly, in some embodiments, file system engines may be arranged to employ rules, instruction, parameters, system/instance templates, or the like, provided via configuration information to provision replacement compute instances from the cloud computing environment.

In one or more of the various embodiments, leader nodes for the file system may direct the cloud computing environment to provision the replacement compute instances. In some cases, leader nodes may be storage nodes that are selected/elected by other storage nodes in the same file system cluster. In other cases, leader nodes may be dedicated services, applications, or the like, that may not be storage nodes.

Note, in some embodiments, file system engines may be arranged to execute one or more actions described in flowchart blocs 1804A and 1804B concurrently. At flowchart block 1806, in one or more of the various embodiments, file system engines may be arranged to reconstitute the one or more storage volumes and associate them with the replacement compute instance. In one or more of the various embodiments, elevator engines may be arranged to initialize the storage volume data structures for the replacement storage node. In some embodiments, this may include associating the block blobs that were associated with the failed storage node with storage volumes of the replacement storage node.

Accordingly, in some embodiments, the replacement storage node may be returned to service absent long running recovery operations that would otherwise be required to recover the content of its storage volumes. The long running recovery operations may be skipped because the data stored in the block blobs that were associated with the failed storage node may remain intact.

Next, in one or more of the various embodiments, control may be returned to a calling process.

Figure 19:
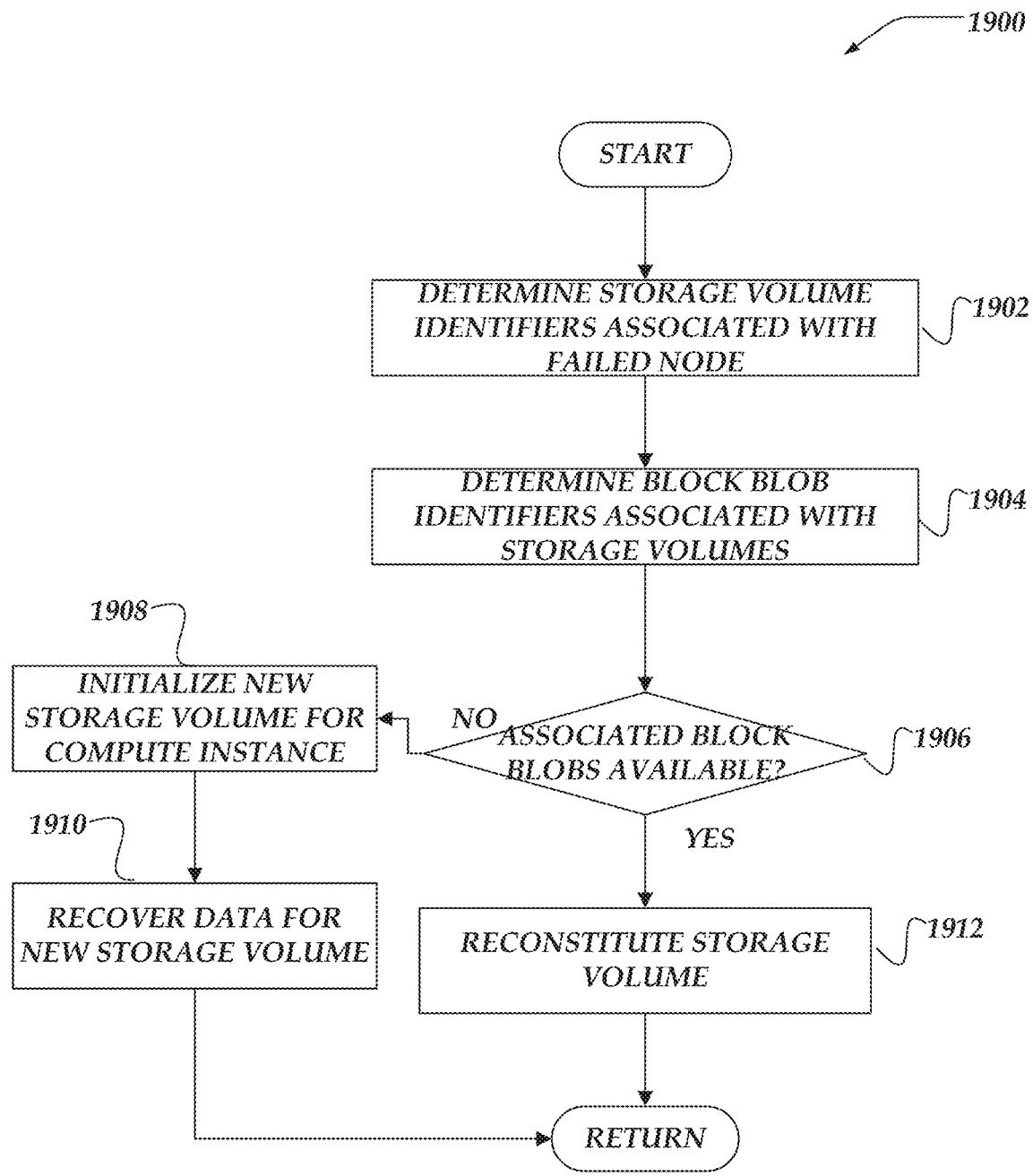
FIG. 19 illustrates a flowchart for a process for managing storage node failures in association with serverless disk drives based on cloud storage in accordance with one or more of the various embodiments.

FIG. 19 illustrates a flowchart for process 1900 for managing storage node failures in association with serverless disk drives based on cloud storage in accordance with one or more of the various embodiments. Note, in some embodiments, process 1900 may be considered to be actions performed by file system engines for process 1800 at flowchart block 1804A.

After a start block, at flowchart block 1902, in one or more of the various embodiments, file system engines may be arranged to determine the one or more storage volume identifiers associated with the storage volumes of the failed storage node. In one or more of the various embodiments, file system engines may be arranged to include one or more data structures that track the identities or status or the compute instances, storage volumes, cache volumes, page blobs, block blobs, or the like, that may comprise a file system cluster. Thus, in some embodiments, file system engines or elevator engines may be arranged to determine the storage volume identifiers associated with the failed storage node. For example, in some embodiments, file system engines may be arranged to maintain a database that includes the identifiers of the various compute instances, storage volumes, cache volumes, page blobs, block blobs, or the like, that comprise a file system.

At flowchart block 1904, in one or more of the various embodiments, file system engines may be arranged to determine the one or more block blob identifiers associated with the one or more storage volumes that were associated with the failed storage node. As described herein, in some embodiments, elevator engines may be arranged to associate identifiers with block blobs as they are provisioned from the cloud computing environment. Accordingly, in some embodiments, elevator engines or file system engines may be arranged to employ data structures to associate these block blob identifiers with their respective storage volumes. Accordingly, in some embodiments, if the storage volumes associated with failed storage nodes may be determined, the block blobs associated with those storage volumes may be determined.

At decision flowchart block 1906, in one or more of the various embodiments, if the associated blobs remain available in the cloud computing environment, control may flow to flowchart block 1912; otherwise, control may flow to flowchart block 1908.

In some cases, the blobs that were associated with the failed storage node may remain intact or otherwise available in the cloud computing environment. This may occur because blobs provided by cloud computing environments may be objects in the cloud computing environment that may be managed independently from compute instances. Thus, if a compute instance fails, the blobs or page blobs comprising the cache volume or storage volumes of the failed storage nodes may remain available or intact in the cloud computing environment.

However, in some cases, depending on the type of failure, blobs associated with failed storage nodes may be unavailable. For example, if the storage node failed because the blobs associated with its storage volumes failed, those blobs may not be available or intact. In contrast, if the storage node fails because the compute instance of the storage node crashed, it may be likely that the blobs associated with the failed node may remain available or otherwise intact.

At flowchart block 1908, in one or more of the various embodiments, file system engines may be arranged to initialize one or more new storage volumes for the replacement compute instance. In some embodiments, the blobs that were associated with the failed storage node may be unavailable.

Accordingly, in some embodiments, elevator engines or file system engines may be arranged to provision one or more new blobs from the cloud computing environment and associate them with the storage volumes for the replacement storage node.

In one or more of the various embodiments, elevator engines may be arranged to initialize the new storage volume with one or more newly provisioned blobs. In some cases, in anticipation of data recovery operations, elevator engines or file system engines may determine the number of blobs to provision based on the amount of data was previously being stored in the storage volumes of the failed storage node. In other cases, elevator engines or file system engines may be arranged to provision an initial blob and let the elevator engine add other blobs as data is added to the initialized storage volumes during data recovery operations.

At flowchart block 1910, in one or more of the various embodiments, file system engines may be arranged to recover the data that was associated with the failed storage node and regain access to it.

One of ordinary skill in the art will appreciate that distributed file system platforms may be arranged to employ data recovery strategies or data redundancy strategies to mitigate the chance of data loss in the face of failed storage volumes. For example, in some embodiments, deployed file systems may be configured to employ erasure coding that provides protection against data loss. The particular level of protection or the specific recovery operations may vary depending on the file systems. Accordingly, for brevity and clarity detailed description of recovery operations is not included here. However, one of ordinary skill in the art will appreciate that file systems may employ competent recovery operations to restore data from the lost blobs and store it in the newly provisioned blobs associated with the storage volumes of the replacement storage nodes.

At flowchart block 1912, in one or more of the various embodiments, file system engines may be arranged to reconstitute the one or more storage volumes and associate them with the replacement compute instance. In one or more of the various embodiments, elevator engines may be arranged to initialize the storage volume data structures for the replacement storage node. In some embodiments, this may include associating the blobs that were associated with the failed storage node with storage volumes of the replacement storage node.

Accordingly, in some embodiments, the replacement storage node may be returned to service absent long running recovery operations that would otherwise be required to recover the content of its storage volumes. The long running recovery operations may be skipped because the data stored in the blobs that were associated with the failed storage node may remain intact.

Next, in one or more of the various embodiments, control may be returned to a calling process. (E.g., to process 1800 at flowchart block 1806.)

Figure 20:
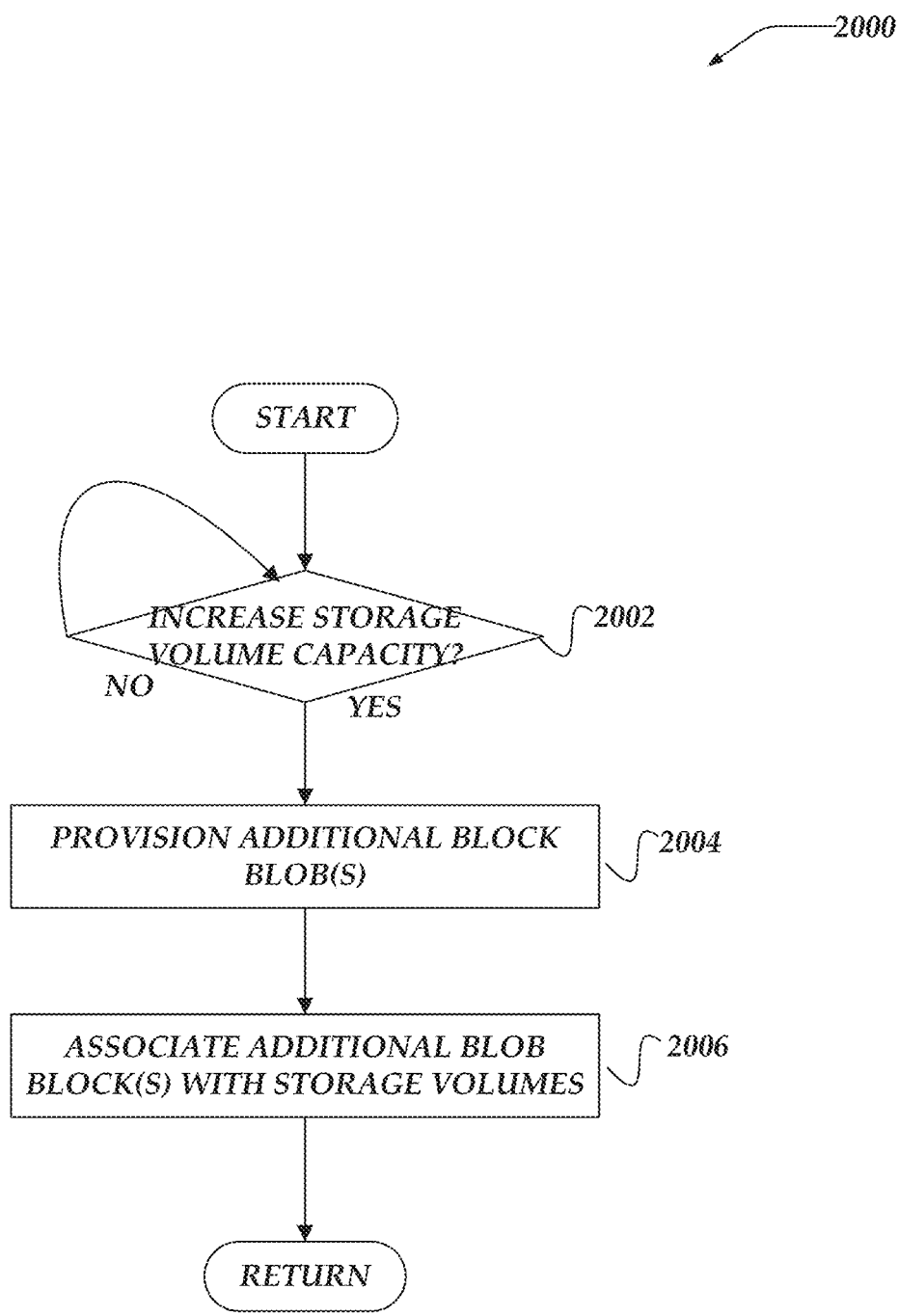
FIG. 20 illustrates a flowchart for a process for adding capacity to storage volumes for serverless disk drives based on cloud storage in accordance with one or more of the various embodiments.

FIG. 20 illustrates a flowchart for process 2000 for adding capacity to storage volumes for serverless disk drives based on cloud storage in accordance with one or more of the various embodiments. After a start flowchart block, at decision block 2002, in one or more of the various embodiments, if elevator engines determine that additional capacity may be added to one or more storage volumes, control may flow to flowchart block 2004; otherwise, control may loop back to decision flowchart block 2002.

As described above, in some embodiments, storage volumes may be comprised of more than one blob. In one or more of the various embodiments, each blob in a storage volume provides storage for a storage volume sector that represents a portion of the addressable storage capacity supported by a storage volume.

For example, if each blob can provide 1 TB of storage, a storage volume that provides 100 TB of storage may be comprised of 100 storage volume sectors, each representing $\frac{1}{100}$ of the storage capacity. Note, as described above, storage volumes may include data structures, such as, sparse lists, or the like, such that individual blobs may be provisioned and associated with storage volume sectors if data is being stored in them. For example, if a storage volume that has a capacity of 100 TB is storing 10 TB, it may require 10 1 TB blobs provisioned from the cloud computing environment. In contrast, if the 100 TB storage volume is filled to capacity it may require 100 1 TB blobs provisioned from the cloud computing environment.

In one or more of the various embodiments, the capacity of storage volume sectors and the size of blobs may depend on the cloud computing environment where factors such as maximum blob size, cost/price, or the like, may vary. Accordingly, in some embodiments, file system engines or elevator engines may be arranged to employ rules, parameters, or the like, provided via configuration information to determine blob size or storage volume sector size.

In one or more of the various embodiments, elevator engines or file system engines may be arranged to automatically provision additional blobs as more storage capacity may be required. In one or more of the various embodiments, elevator engines may be arranged to employ rules, conditions, schedules, threshold values, or the like, to determine if additional blobs should be provisioned from the cloud computing environment for one or more storage volumes. For example, in some embodiments, elevator engines may be configured to automatically provision a new blob if the available space on currently provisioned blobs of a storage volume falls below a threshold value. Further, in some embodiments, elevator engines may be arranged to automatically provision one or more blobs based on the address or storage volume sector associated with write requests. For example, if a write request is requesting to store data in a storage volume sector of a storage volume that is not yet backed by a blob, the elevator engine may provision a blob for and associated it with the storage volume sector to store the data. Note, as mentioned above, elevator engines or file system engines may be arranged to write data to lower addresses if possible, to concentrate data in fewer sectors/blobs. However, in some cases, the write request may require the data to be stored at a particular location in the storage volume, including storage volume sectors that have not yet been associated with a provisioned blob.

At flowchart block 2004, in one or more of the various embodiments, file system engines or elevator engines may be arranged to generate one or more blobs.

In one or more of the various embodiments, elevator engines or file system engines may be arranged to maintain one or more data structures that may track if blobs are provisioned for storage volume sector (e.g., address ranges) of storage volumes. Accordingly, in some embodiments, elevator engines may be arranged to divide the address space of storage volumes into sectors that each may be mapped to a blob. In some embodiments, the number of sectors may depend on the capacity of the storage volume and the size of the blobs. For example, if blobs have a capacity of 1 TB, a storage volume with a capacity of 100 TB would include at least 100 sectors—one sector for each blob. However, in some embodiments, blobs for sectors may be provisioned from the cloud computing environment on demand. Thus, in this example, if all the data stored in the storage volume is at addresses in its first sector, one 1 TB blob would be provisioned even though the storage volume has a capacity of 100 TB.

Accordingly, in some embodiments, if data is being stored in a storage volume sector that is not associated with a blob, elevator engines may be arranged to provision a blob on demand and associate it with the sector where the data is being stored.

In one or more of the various embodiments, elevator engines may be arranged to one or more APIs provided by cloud computing environments to provision blobs. Accordingly, in some embodiments, elevator engines may provide parameter values that enable the cloud computing environment to provision blobs sized to match the size of the storage volume sectors. Accordingly, in some embodiments, elevator engines may be arranged to employ rules, instructions, libraries, or the like, provided by configuration information to account for differences in cloud computing environment APIs as well as other local requirements or other local circumstances.

At flowchart block 2006, in one or more of the various embodiments, file system engines or elevator engines may be arranged to associate the one or more additional blobs with the one or more storage volumes. In some embodiments, elevator engines may be arranged to associate each provisioned blobs with a storage volume sector that corresponds to a range of addresses in the storage volume.

In one or more of the various embodiments, storage volumes comprised of one or more data structures that map address ranges in the storage volume to blobs. For example, in some embodiments, storage volumes may include sparse lists that associate blobs with address ranges or storage volume sectors. In some embodiments, blob identifiers or handles provided by the cloud computing environment may be employed to associate address ranges to blobs.

Next, in one or more of the various embodiments, control may be returned to a calling process.

Figure 21:
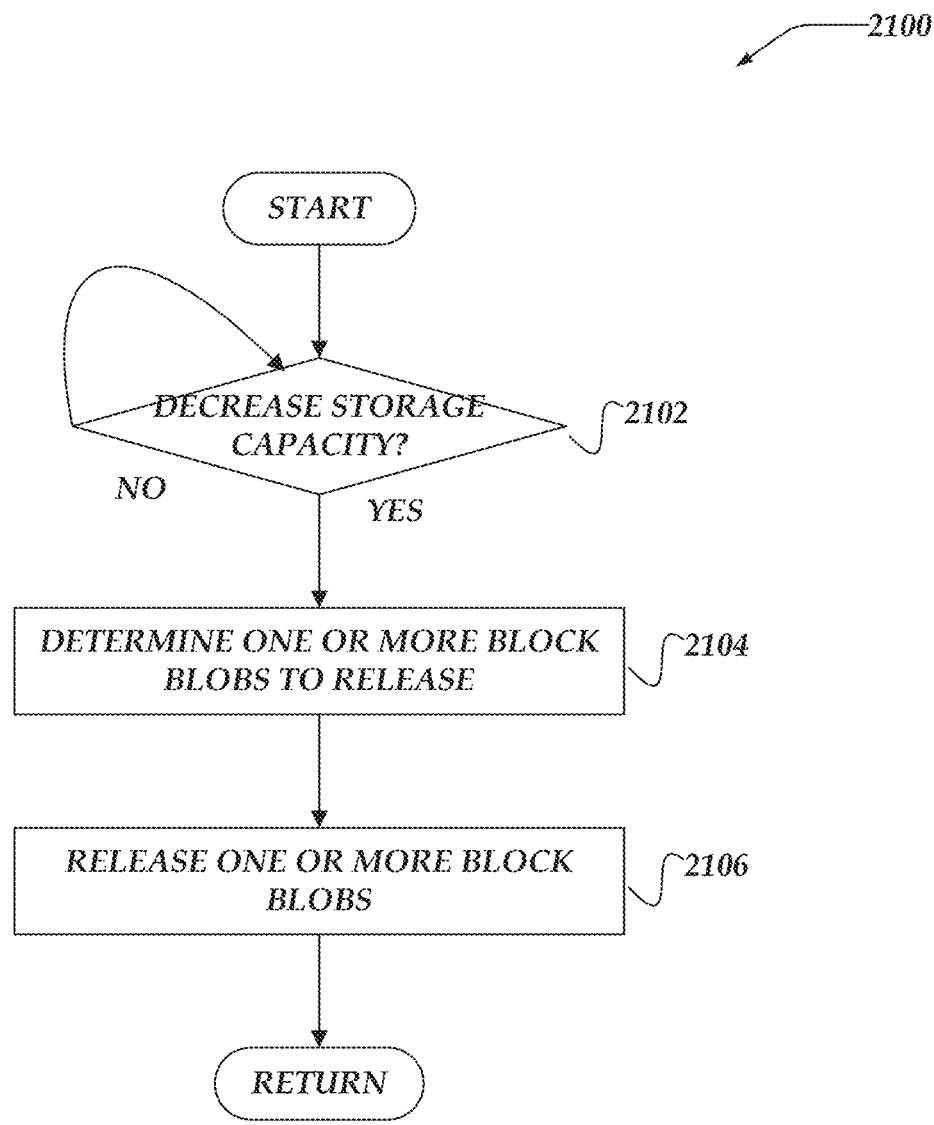
FIG. 21 illustrates a flowchart for a process for reducing cloud storage associated with storage volumes for serverless disk drives based on cloud storage in accordance with one or more of the various embodiments.

FIG. 21 illustrates a flowchart for process 2100 for reducing cloud storage associated with storage volumes for serverless disk drives based on cloud storage in accordance with one or more of the various embodiments. After a start flowchart block, at decision block 2102, in one or more of the various embodiments, if the file system engine determines that storage capacity associated with one or more storage volumes may be reduced, control may flow to flowchart block 2104; otherwise, control may loop back to decision flowchart block 2102. As described above, in some embodiments, storage volumes may be comprised of more than one blob. In one or more of the various embodiments, each blob in a storage volume provides storage for a portion (e.g., a storage volume sector) of the addressable storage capacity supported by a storage volume.

In one or more of the various embodiments, elevator engines or file system engines may be arranged to release or discard one or more blobs depending on various conditions. For example, in some embodiments, elevator engines may be arranged to automatically release empty/unused blobs. Thus, even though the storage volume is offering 100 TB of storage, unused or empty blobs may be released back to the cloud computing environment. In some embodiments, releasing unused blobs may be advantageous because it may reduce the cost of operating the file system in the cloud computing environment. Likewise, in some embodiments, releasing unused blobs may be advantageous because it may enable other services in the cloud computing environment to use those resources.

For example, in some embodiments, if data in a storage volume is deleted by a file system client, it may result in one or more empty or unused blobs. Accordingly, in some embodiments, elevator engines may be arranged to perform one or more actions to release the empty or unused blobs.

At flowchart block 2104, in one or more of the various embodiments, elevator engines may be arranged to determine one or more blobs to release. In one or more of the various embodiments, elevator engines or file system engines may be arranged to maintain one or more data structures that may track if space on in the storage volume or blobs is being used to store data. For example, in one or more of the various embodiments, storage nodes may be arranged to maintain a free list that tracks locations in its storage volumes that are not storing data for file system clients.

Accordingly, in one or more of the various embodiments, elevator engines may be arranged to monitor if one or more blobs comprising its storage volume may be empty. For example, in some embodiments, if file system clients execute commands to delete data from the file system, elevator engines may be arranged to check if the blobs that stored the deleted data are empty.

At flowchart block 2106, in one or more of the various embodiments, elevator engines may be arranged to release the one or more determined blobs to the cloud computing environment. In one or more of the various embodiments, elevator engines may be arranged to execute operations using one or more cloud computing environment APIs to release or discard the one or more empty blobs. Note, in some embodiments, upon release of the empty blobs, the corresponding storage volume may still advertise the same capacity to clients because blobs may be provisioned on demand if the storage space may be required to store data.

Next, in one or more of the various embodiments, control may be returned to a calling process.

Figure 22:
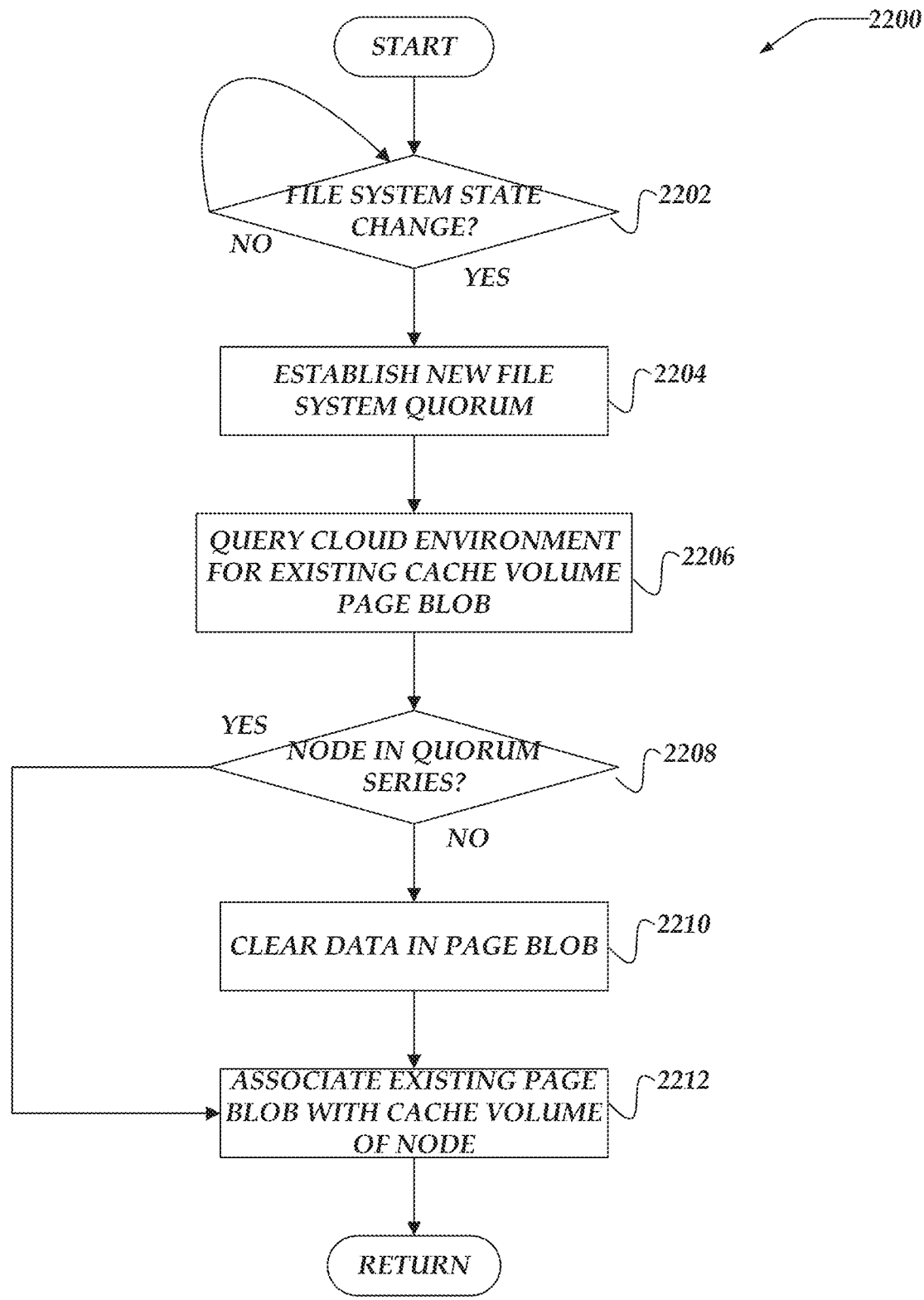
FIG. 22 illustrates a flowchart for a process for managing cache tiers for serverless disk drives based on cloud storage in accordance with one or more of the various embodiments.

FIG. 22 illustrates a flowchart for process 2200 for managing cache volumes for serverless disk drives based on cloud storage in accordance with one or more of the various embodiments. After a start flowchart block, at flowchart block 2202, in one or more of the various embodiments, if the file system experiences a configuration state change, control may flow to flowchart block 2204; otherwise, control may loop back to decision block 2202.

In one or more of the various embodiments, as described above, distributed file systems may be comprised of two or more storage nodes. Accordingly, file system engines may be arranged to employ one or more consensus strategies to ensure that each node in the file system may be in sync with respect to system-wide configuration, status information, or the like.

In some embodiments, a change of state in this context may be changes related to one or more of system-wide status or configuration changes, such as, increasing/decreasing storage capacity, storage node failures, storage failures, network changes, adding/removing storage nodes, high-availability configuration changes, shutdowns, startups, increasing/decreasing protection level, encryption/security settings, or the like. Thus, in some embodiments, file system engines may employ consensus mechanisms to ensure that the nodes in a distributed file system may be in agreement with respect to various configuration changes.

Herein, in some embodiments, if the storage nodes in a file system are in agreement with the current state of the file system, the file system may be considered to be in quorum. Accordingly, in some embodiments, if a state change in the file system occurs, the file system may be considered out-of-quorum until the storage nodes in the file system reach a consensus with respect to the state change. For example, in some embodiments, if a storage node is added to a file system that is in quorum, adding the storage node may bring the file system out-of-quorum because there may not be agreement among the existing members of the file system regarding the new storage node. For example, the new storage node may be allocated responsibility for providing/managing a portion of the storage for the file system. However, unless all the storage nodes may be in agreement about which portion of the file system the new storage node is responsible for, the file system may be inconsistent.

One of ordinary skill in the art, will appreciate that different file systems may employ different conditions or standards for determining if the file system may be out of quorum. For example, in some embodiments, file system A may support different types of configuration choices than file system B.

At flowchart block 2204, in one or more of the various embodiments, file system engines may be arranged to establish a new file system quorum for the storage nodes comprising the file system.

One of ordinary skill in the art, will appreciate that different file systems may employ different operations or standards for determining if the file system may be in quorum. Likewise, in some embodiments, different file systems may have different conditions for determining if the file system is in quorum.

For example, in one or more of the various embodiments, some file system may be arranged to have dedicated/specialized controller nodes that watch over the state of the file system. In contrast, for example, another file system may be arranged such that storage nodes in a cluster may elect a leader node based on one or more rules.

For example, if a file system is restarted, all of the storage nodes may boot up local file system engines that agree to select one storage node to be the leader node that drives the startup, configuration, validation, or the like, that may be associated with the file system. In some file systems, storage nodes may be associated with an identifier that identifies the file system cluster, as well as a serial number that may be unique within the cluster to identify individual storage nodes within the cluster. Thus, in some embodiments, the storage nodes in the same cluster may be enabled to identify/validate the other nodes in the cluster. Likewise, the node serial number may be used to elect/identify a leader node in the cluster. For example, the storage nodes in cluster may be arranged to elect the storage node with the lowest valued serial number to be the leader node. Then if a leader node may be elected, the leader node may begin executing one or more operations to distribute/validate cluster-wide configuration settings, execute data recovery, re-balance data, or the like. Note, the particular operations may depend on the specific features of the file system. One of ordinary skill in the art will appreciate the different file systems may perform different actions or have different requirements for establishing a quorum among its storage nodes.

At flowchart block 2206, in one or more of the various embodiments, file system engines or elevator engines may be arranged to query the cloud computing environment for page blobs that may be providing storage cache volumes for one or more storage nodes in the file system cluster.

As described above, in some embodiments, storage nodes in a file system may be comprised of more than one cloud computing environment objects that may be provisioned or instantiated separately or independently. For example, storage nodes may be comprised of compute instance objects, one or more storage objects, one or more virtualized network interfaces, or the like. File system may be operating on different cloud computing environments, including, customized private clouds, vendor provided cloud computing environments, or the like. Thus, the object types, object nomenclatures, access APIs, pricing, performance features, or the like, may vary depending on the particular cloud computing environment that may be hosting the file system.

In some embodiments, cloud computing environments may provide APIs that enable users/services to query for different objects that may be provisioned in the cloud computing environment. For example, a cloud computing environment may enable file system engines to query the cloud computing environment for compute instances that may be part of the same file system cluster. Likewise, cloud computing environments may provide APIs that enable queries for other objects, such as, page blobs, block blocks, or the like. Typically, cloud computing environments may provide object handles that may be considered references or pointers to particular objects provided by the cloud computing environment. Further, in some embodiments, cloud computing environments often provide APIs that enable users/services to associate meta-data with provisioned objects. For example, each compute instance that may be part of the same file system cluster may be associated with meta-data that enables storage nodes in the same cluster to find or identify each other. For example, initialization processes that provision storage nodes may associate meta-data that includes a file system identifier and a serial number with each computer instance provisioned for storage nodes in a file system. Likewise, in some embodiments, file system configuration may specify various parameters for cache volumes, including meta-data (e.g., tags) to associate page blobs with storage nodes.

Accordingly, in some embodiments, file system engines may be arranged to query cloud computing environments for existing page blobs based on meta-data associated with the file system or the page blobs, such as, file system identifiers, storage node identifiers, page blob identifiers, or the like. Thus, in some embodiments, file system engines may be arranged to query cloud computing environments to determine if there may be page blobs available that have already been provisioned or used in the file system.

Further, in some embodiments, if there may be existing page blobs, file system engines may be arranged to determine which storage node is or were associated with the page blob. In some cases, the page blobs may still contain the cached data that was stored in the cache volume of a storage node. For example, if a storage node comprised of a computer instance may be shutdown, the compute instance may stop running, resulting in its processes shutting down and local volatile memory being released/discard. However, in some embodiments, the page blobs comprising the storage node's cache volume may remain intact in the cloud computing environment unless they are explicitly deleted, released, or otherwise de-provisioned. Thus, in some embodiments, the data in the page blob used for a storage node's cache volume may remain available such that that the cache volume of the storage node may be restored.

At decision flowchart block 2206, in one or more of the various embodiments, if a storage node may in a quorum series with the new quorum, control may flow the flowchart block 2212; otherwise, control may flow to flowchart block 2210.

In some embodiments, a storage node may be considered to be in series with a quorum if the storage node was in the last quorum. Thus, if a storage node is determined to be part of quorum series, it has been in quorum for one or more previous quorums. For example, if a storage node that was removed from a cluster such that it missed a subsequent cluster quorum is added back to the cluster, it will be considered out of series because it has missed one or more quorums that occurred in the cluster.

In one or more of the various embodiments, file system engines may be arranged to track quorums using counters, index values, or the like, that may be incremented each time a quorum in a cluster is reached. Thus, if one or more storage nodes have quorum counter values that do not match the leader node's quorum counter value, those storage nodes may be considered out of series or otherwise not in a quorum series with the cluster as a whole.

At flowchart block 2210, in one or more of the various embodiments, file system engines or elevator engines may be arranged to clear/discard the data stored in page blobs associated with storage nodes not in the quorum series. In one or more of the various embodiments, if the page blobs associated with out-of-series storage nodes are holding data, elevator engines or file system engines may be arranged to discard the contents of those page blobs. Also, in some embodiments, the page blob capacity may be trimmed or reset to an initial value.

At flowchart block 2212, in one or more of the various embodiments, file system engines or elevator engines may be arranged to associate existing page blobs with storage nodes to provide cache volumes.

In one or more of the various embodiments, file system engines or elevator engines may be arranged to logically associate the page blobs with their corresponding compute instance to provide the cache volume for the storage node. Thus, in some embodiments, if the storage node was in series with the cluster quorum, the cache tier may be reconstituted using the data included in the page blob. In contrast, in some embodiments, the cache volume for new storage nodes or otherwise out-of-series storage node may be empty.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multiprocessor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
   providing the file system that includes a plurality of storage nodes and a plurality of storage volumes, wherein each storage node is a compute instance provided by a cloud computing environment (CCE) and each storage volume is based on one or more blobs provided by the CCE, wherein each blob corresponds to a range of addresses in the storage volume;
   providing one or more write requests that include write data from one or more clients of the file system;
   determining a lowest range of addresses in the storage volume for storing the write data;
   determining one or more buckets based on the range of addresses, wherein the one or more buckets correspond to a portion of the one or more blobs that correspond to the lowest range of addresses, and wherein the write data is assigned to the one or more buckets based on the lowest range of addresses; and
   in response to one or more portions of the one or more buckets remaining unassigned to the write data, performing further actions, including:
      providing other data for the one or more unassigned portions of the bucket, wherein the other data is provided from one or more of a cache volume or the one or more blobs;
      writing the write data and the other data to the portion of the one or more blobs; and
      providing one or more responses to the one or more write requests to the one or more clients.

2. The method of claim 1, further comprising:
   in response to a delete request being provided by the one or more clients, performing further actions, including:
      updating a free list based on another range of addresses associated with the delete request, wherein the free list includes one or more addresses in the one or more storage volumes;

determining one or more empty buckets based on the free list, wherein each location in each empty bucket corresponds to a portion of the one or more addresses;

releasing the one or more empty data blocks within each blob to the CCE to reduce an amount of unused CCE storage space allocated to the file system; and releasing the one or more empty blobs to the CCE to reduce an amount of unused CCE storage space allocated to the file system.

3. The method of claim 1, further comprising:

providing one or more read requests from the one or more clients;

determining another range of addresses in the storage volume associated with the read request;

determining one or more read buckets based on the other range of addresses, wherein the one or more read buckets correspond to one or more other blobs that correspond to the other range of addresses; and in response to the one or more read buckets being associated with a pending read job, determining read data for the one or more read requests at the completion of the read job;

in response to the one or more read buckets being unassociated with a pending read job, performing further actions, including:

generating a read job for the reading of the one or more read buckets from the one or more blobs;

adding the read job to a read queue that is sorted based on the other range of addresses associated with the one or more read requests, wherein the read job is positioned ahead of one or more other read jobs in the queue having a read address range that is higher than the read job; and executing the read job to provide the read data for the one or more read requests, wherein the read data is provided from the one or more other blobs.

4. The method of claim 1, wherein providing the one or more storage volumes, further comprises:

providing an identifier of the file system and another identifier for each storage volume;

determining a total address range for each storage volume based on a defined capacity of the storage volume;

partitioning the total address range of each storage volume into one or more portions of the total address range, wherein each portion of the total address range corresponds to a same-sized portion of the capacity of each storage volume;

provisioning the one or more blobs from the CCE, wherein a capacity of each blob is equal to a portion of the total address range, and wherein a number of provisioned blobs is less than a count of the one or more portions of the total address range; and associating the one or more blobs with the file system identifier and the storage volume identifier of its corresponding storage volume.

5. The method of claim 1, further comprising:

in response to the lowest range of addresses in the storage volume for storing the write data exceeding a maximum address that corresponds to a previously provisioned blob, performing further actions, including:

provisioning one or more other blobs with a same defined capacity from the CCE;

associating the one or more other blobs with another range of addresses that includes the lowest range of addresses determined for storing the write data; and storing the write data in the one or more other blobs.

6. The method of claim 1, further comprising:

in response to one or more compute instances for one or more storage nodes becoming unavailable, performing further actions, including:

employing the CCE to determine one or more unattached blobs that are associated with the one or more unavailable compute instances based on one or more identifiers associated with the file system and the one or more storage nodes; and employing the CCE to associate the one or more unattached blobs with one or more available storage nodes in the file system, wherein the one or more available storage nodes enable information previously stored on the one or more unattached blobs to be available to the file system.

7. The method of claim 1, further comprising:

in response to an increased compute performance requirement for the file system, performing further actions, including:

employing the CCE to provision one or more additional compute instances;

determining another portion of the one or more blobs based on the increased performance requirements and the one or more additional compute instances;

detaching the portion of the one or more blobs from the plurality of storage nodes; and attaching the other portion of the one or more blobs to the additional computer instances.

8. A network computer for managing data in a file system, comprising:

a memory that stores at least instructions; and one or more processors that execute instructions that perform actions, including:

providing the file system that includes a plurality of storage nodes and a plurality of storage volumes, wherein each storage node is a compute instance provided by a cloud computing environment (CCE) and each storage volume is based on one or more blobs provided by the CCE, wherein each blob corresponds to a range of addresses in the storage volume;

providing one or more write requests that include write data from one or more clients of the file system;

determining a lowest range of addresses in the storage volume for storing the write data;

determining one or more buckets based on the range of addresses, wherein the one or more buckets correspond to a portion of the one or more blobs that correspond to the lowest range of addresses, and wherein the write data is assigned to the one or more buckets based on the lowest range of addresses; and in response to one or more portions of the one or more buckets remaining unassigned to the write data, performing further actions, including:

providing other data for the one or more unassigned portions of the bucket, wherein the other data is provided from one or more of a cache volume or the one or more blobs;

writing the write data and the other data to the portion of the one or more blobs; and providing one or more responses to the one or more write requests to the one or more clients.

9. The network computer of claim 8, wherein the one or more processors execute instructions that perform actions, further comprising:

in response to a delete request being provided by the one or more clients, performing further actions, including:

updating a free list based on another range of addresses associated with the delete request, wherein the free list includes one or more addresses in the one or more storage volumes;

determining one or more empty buckets based on the free list, wherein each location in each empty bucket corresponds to a portion of the one or more addresses;

releasing the one or more empty data blocks within each blob to the CCE to reduce an amount of unused CCE storage space allocated to the file system; and releasing the one or more empty blobs to the CCE to reduce an amount of unused CCE storage space allocated to the file system.

10. The network computer of claim 8, wherein the one or more processors execute instructions that perform actions, further comprising:

providing one or more read requests from the one or more clients;

determining another range of addresses in the storage volume associated with the read request;

determining one or more read buckets based on the other range of addresses, wherein the one or more read buckets correspond to one or more other blobs that correspond to the other range of addresses; and in response to the one or more read buckets being associated with a pending read job, determining read data for the one or more read requests at the completion of the read job;

in response to the one or more read buckets being unassociated with a pending read job, performing further actions, including:
  generating a read job for the reading of the one or more read buckets from the one or more blobs;
  adding the read job to a read queue that is sorted based on the other range of addresses associated with the one or more read requests, wherein the read job is positioned ahead of one or more other read jobs in the queue having a read address range that is higher than the read job; and
  executing the read job to provide the read data for the one or more read requests, wherein the read data is provided from the one or more other blobs.

11. The network computer of claim 8, wherein providing the one or more storage volumes, further comprises:

providing an identifier of the file system and another identifier for each storage volume;

determining a total address range for each storage volume based on a defined capacity of the storage volume;

partitioning the total address range of each storage volume into one or more portions of the total address range, wherein each portion of the total address range corresponds to a same-sized portion of the capacity of each storage volume;

provisioning the one or more blobs from the CCE, wherein a capacity of each blob is equal to a portion of the total address range, and wherein a number of provisioned blobs is less than a count of the one or more portions of the total address range; and associating the one or more blobs with the file system identifier and the storage volume identifier of its corresponding storage volume.

12. The network computer of claim 8, wherein the one or more processors execute instructions that perform actions, further comprising:

in response to the lowest range of addresses in the storage volume for storing the write data exceeding a maximum address that corresponds to a previously provisioned blob, performing further actions, including:
  provisioning one or more other blobs with a same defined capacity from the CCE;
  associating the one or more other blobs with another range of addresses that includes the lowest range of addresses determined for storing the write data; and
  storing the write data in the one or more other blobs.

13. The network computer of claim 8, wherein the one or more processors execute instructions that perform actions, further comprising:

in response to one or more compute instances for one or more storage nodes becoming unavailable, performing further actions, including:
  employing the CCE to determine one or more unattached blobs that are associated with the one or more unavailable compute instances based on one or more identifiers associated with the file system and the one or more storage nodes; and
  employing the CCE to associate the one or more unattached blobs with one or more available storage nodes in the file system, wherein the one or more available storage nodes enable information previously stored on the one or more unattached blobs to be available to the file system.

14. The network computer of claim 8, wherein the one or more processors execute instructions that perform actions, further comprising:

in response to an increased compute performance requirement for the file system, performing further actions, including:
  employing the CCE to provision one or more additional compute instances;
  determining another portion of the one or more blobs based on the increased performance requirements and the one or more additional compute instances;
  detaching the portion of the one or more blobs from the plurality of storage nodes; and
  attaching the other portion of the one or more blobs to the additional computer instances.

15. A processor readable non-transitory storage media that includes instructions for managing data in a file system over a network, wherein execution of the instructions by one or more processors on one or more network computers performs actions, comprising:

providing the file system that includes a plurality of storage nodes and a plurality of storage volumes, wherein each storage node is a compute instance provided by a cloud computing environment (CCE) and each storage volume is based on one or more blobs provided by the CCE, wherein each blob corresponds to a range of addresses in the storage volume;

providing one or more write requests that include write data from one or more clients of the file system;

determining a lowest range of addresses in the storage volume for storing the write data;

determining one or more buckets based on the range of addresses, wherein the one or more buckets correspond to a portion of the one or more blobs that correspond to the lowest range of addresses, and wherein the write data is assigned to the one or more buckets based on the lowest range of addresses; and in response to one or more portions of the one or more buckets remaining unassigned to the write data, performing further actions, including:

providing other data for the one or more unassigned portions of the bucket, wherein the other data is provided from one or more of a cache volume or the one or more blobs;

writing the write data and the other data to the portion of the one or more blobs; and providing one or more responses to the one or more write requests to the one or more clients.

16. The media of claim 15, further comprising:

in response to a delete request being provided by the one or more clients, performing further actions, including:

updating a free list based on another range of addresses associated with the delete request, wherein the free list includes one or more addresses in the one or more storage volumes;

determining one or more empty buckets based on the free list, wherein each location in each empty bucket corresponds to a portion of the one or more addresses;

releasing the one or more empty data blocks within each blob to the CCE to reduce an amount of unused CCE storage space allocated to the file system; and releasing the one or more empty blobs to the CCE to reduce an amount of unused CCE storage space allocated to the file system.

17. The media of claim 15, further comprising:

providing one or more read requests from the one or more clients;

determining another range of addresses in the storage volume associated with the read request;

determining one or more read buckets based on the other range of addresses, wherein the one or more read buckets correspond to one or more other blobs that correspond to the other range of addresses; and in response to the one or more read buckets being associated with a pending read job, determining read data for the one or more read requests at the completion of the read job;

in response to the one or more read buckets being unassociated with a pending read job, performing further actions, including:

generating a read job for the reading of the one or more read buckets from the one or more blobs;

adding the read job to a read queue that is sorted based on the other range of addresses associated with the one or more read requests, wherein the read job is positioned ahead of one or more other read jobs in the queue having a read address range that is higher than the read job; and executing the read job to provide the read data for the one or more read requests, wherein the read data is provided from the one or more other blobs.

18. The media of claim 15, wherein providing the one or more storage volumes, further comprises:

providing an identifier of the file system and another identifier for each storage volume;

determining a total address range for each storage volume based on a defined capacity of the storage volume;

partitioning the total address range of each storage volume into one or more portions of the total address range, wherein each portion of the total address range corresponds to a same-sized portion of the capacity of each storage volume;

provisioning the one or more blobs from the CCE, wherein a capacity of each blob is equal to a portion of the total address range, and wherein a number of provisioned blobs is less than a count of the one or more portions of the total address range; and associating the one or more blobs with the file system identifier and the storage volume identifier of its corresponding storage volume.

19. The media of claim 15, further comprising:

in response to the lowest range of addresses in the storage volume for storing the write data exceeding a maximum address that corresponds to a previously provisioned blob, performing further actions, including:

provisioning one or more other blobs with a same defined capacity from the CCE;

associating the one or more other blobs with another range of addresses that includes the lowest range of addresses determined for storing the write data; and storing the write data in the one or more other blobs.

20. The media of claim 15, further comprising:

in response to one or more compute instances for one or more storage nodes becoming unavailable, performing further actions, including:

employing the CCE to determine one or more unattached blobs that are associated with the one or more unavailable compute instances based on one or more identifiers associated with the file system and the one or more storage nodes; and employing the CCE to associate the one or more unattached blobs with one or more available storage nodes in the file system, wherein the one or more available storage nodes enable information previously stored on the one or more unattached blobs to be available to the file system.

21. The media of claim 15, further comprising:

in response to an increased compute performance requirement for the file system, performing further actions, including:

employing the CCE to provision one or more additional compute instances;

determining another portion of the one or more blobs based on the increased performance requirements and the one or more additional compute instances;

detaching the portion of the one or more blobs from the plurality of storage nodes; and attaching the other portion of the one or more blobs to the additional computer instances.

22. A system for managing data in a file system comprising:

a network computer, comprising:

a memory that stores at least instructions; and one or more processors that execute instructions that perform actions, including:

providing the file system that includes a plurality of storage nodes and a plurality of storage volumes, wherein each storage node is a compute instance provided by a cloud computing environment (CCE) and each storage volume is based on one or more blobs provided by the CCE, wherein each blob corresponds to a range of addresses in the storage volume;

providing one or more write requests that include write data from one or more clients of the file system;

determining a lowest range of addresses in the storage volume for storing the write data;

determining one or more buckets based on the range of addresses, wherein the one or more buckets correspond to a portion of the one or more blobs that correspond to the lowest range of addresses, and wherein the write data is assigned to the one or more buckets based on the lowest range of addresses; and in response to one or more portions of the one or more buckets remaining unassigned to the write data, performing further actions, including:

providing other data for the one or more unassigned portions of the bucket, wherein the other data is provided from one or more of a cache volume or the one or more blobs;

writing the write data and the other data to the portion of the one or more blobs; and providing one or more responses to the one or more write requests to the one or more clients; and a client computer, comprising:

a memory that stores at least instructions; and one or more processors that execute instructions that perform actions, including, providing the one or more write requests.

23. The system of claim 22, wherein the one or more network computer processors execute instructions that perform actions, further comprising:

in response to a delete request being provided by the one or more clients, performing further actions, including:

updating a free list based on another range of addresses associated with the delete request, wherein the free list includes one or more addresses in the one or more storage volumes;

determining one or more empty buckets based on the free list, wherein each location in each empty bucket corresponds to a portion of the one or more addresses;

releasing the one or more empty data blocks within each blob to the CCE to reduce an amount of unused CCE storage space allocated to the file system; and releasing the one or more empty blobs to the CCE to reduce an amount of unused CCE storage space allocated to the file system.

24. The system of claim 22, wherein the one or more network computer processors execute instructions that perform actions, further comprising:

providing one or more read requests from the one or more clients;

determining another range of addresses in the storage volume associated with the read request;

determining one or more read buckets based on the other range of addresses, wherein the one or more read buckets correspond to one or more other blobs that correspond to the other range of addresses; and in response to the one or more read buckets being associated with a pending read job, determining read data for the one or more read requests at the completion of the read job;

in response to the one or more read buckets being unassociated with a pending read job, performing further actions, including:

generating a read job for the reading of the one or more read buckets from the one or more blobs;

adding the read job to a read queue that is sorted based on the other range of addresses associated with the one or more read requests, wherein the read job is positioned ahead of one or more other read jobs in the queue having a read address range that is higher than the read job; and executing the read job to provide the read data for the one or more read requests, wherein the read data is provided from the one or more other blobs.

25. The system of claim 22, wherein providing the one or more storage volumes, further comprises:

providing an identifier of the file system and another identifier for each storage volume;

determining a total address range for each storage volume based on a defined capacity of the storage volume;

partitioning the total address range of each storage volume into one or more portions of the total address range, wherein each portion of the total address range corresponds to a same-sized portion of the capacity of each storage volume;

provisioning the one or more blobs from the CCE, wherein a capacity of each blob is equal to a portion of the total address range, and wherein a number of provisioned blobs is less than a count of the one or more portions of the total address range; and associating the one or more blobs with the file system identifier and the storage volume identifier of its corresponding storage volume.

26. The system of claim 22, wherein the one or more network computer processors execute instructions that perform actions, further comprising:

in response to the lowest range of addresses in the storage volume for storing the write data exceeding a maximum address that corresponds to a previously provisioned blob, performing further actions, including:

provisioning one or more other blobs with a same defined capacity from the CCE;

associating the one or more other blobs with another range of addresses that includes the lowest range of addresses determined for storing the write data; and storing the write data in the one or more other blobs.

27. The system of claim 22, wherein the one or more network computer processors execute instructions that perform actions, further comprising:

in response to one or more compute instances for one or more storage nodes becoming unavailable, performing further actions, including:

employing the CCE to determine one or more unattached blobs that are associated with the one or more unavailable compute instances based on one or more identifiers associated with the file system and the one or more storage nodes; and employing the CCE to associate the one or more unattached blobs with one or more available storage nodes in the file system, wherein the one or more available storage nodes enable information previously stored on the one or more unattached blobs to be available to the file system.

28. The system of claim 22, wherein the one or more network computer processors execute instructions that perform actions, further comprising:

in response to an increased compute performance requirement for the file system, performing further actions, including:

employing the CCE to provision one or more additional compute instances;

determining another portion of the one or more blobs based on the increased performance requirements and the one or more additional compute instances;

detaching the portion of the one or more blobs from the plurality of storage nodes; and attaching the other portion of the one or more blobs to the additional computer instances.

* * * * *